US006805328B2

(12) United States Patent
Filkovski et al.

(10) Patent No.: US 6,805,328 B2
(45) Date of Patent: Oct. 19, 2004

(54) SHUT-OFF VALVE APPARATUS

(75) Inventors: Gregory T. Filkovski, Yorktown, IN (US); Brook W. Pence, Losantville, IN (US); Wayne D. Morroney, Troy, MI (US)

(73) Assignee: Maxon Corporation, Muncie, IN (US)

( * ) Notice: Subject to any disclaimer, the term of this patent is extended or adjusted under 35 U.S.C. 154(b) by 218 days.

(21) Appl. No.: 10/162,357

(22) Filed: Jun. 4, 2002

(65) Prior Publication Data
US 2003/0222234 A1 Dec. 4, 2003

(51) Int. Cl.[7] ............................................... F16K 31/02
(52) U.S. Cl. ..................... 251/29; 251/30.05; 137/102; 91/468
(58) Field of Search ................................ 257/29, 30.02, 257/30.05; 137/102; 91/468

(56) References Cited

U.S. PATENT DOCUMENTS

| 3,082,627 | A | | 3/1963 | Yeo et al. |
|---|---|---|---|---|
| 3,084,676 | A | | 4/1963 | Herlon et al. |
| 3,241,805 | A | | 3/1966 | Schumann |
| 3,290,003 | A | | 12/1966 | Kessler |
| 3,390,943 | A | | 7/1968 | Myers |
| 3,460,798 | A | | 8/1969 | Carsten |
| 3,508,446 | A | | 4/1970 | Yeo et al. |
| 3,685,790 | A | | 8/1972 | Crowe |
| 3,791,619 | A | * | 2/1974 | Pett ........................ 251/30.02 |
| 3,827,451 | A | | 8/1974 | Roob |
| 3,895,648 | A | | 7/1975 | Stoll et al. |
| 3,972,341 | A | | 8/1976 | Wheless |
| 4,043,351 | A | | 8/1977 | Durling |
| 4,068,902 | A | | 1/1978 | Deem et al. |
| 4,079,753 | A | | 3/1978 | Popp |
| 4,187,764 | A | | 2/1980 | Cho |
| 4,204,555 | A | | 5/1980 | Durling |
| 4,237,920 | A | | 12/1980 | Norman |
| 4,432,391 | A | * | 2/1984 | Ott ......................... 137/625.64 |
| 4,450,864 | A | | 5/1984 | Huckebrink |
| 4,457,330 | A | | 7/1984 | Fields |
| 4,494,572 | A | | 1/1985 | Loveless |
| 4,506,700 | A | | 3/1985 | Kramer |
| 4,519,421 | A | | 5/1985 | Stoll |
| 4,524,803 | A | * | 6/1985 | Stoll et al. ............. 137/625.64 |
| 4,586,535 | A | | 5/1986 | Stoll et al. |
| 4,646,785 | A | * | 3/1987 | Ruedle et al. ......... 137/626.64 |

(List continued on next page.)

OTHER PUBLICATIONS

Maxon Corporation Bulletin 6300, *Maxon ACTIONAIR® Valves*, © Oct. 1992.

(List continued on next page.)

*Primary Examiner*—John Bastianelli
(74) *Attorney, Agent, or Firm*—Barnes & Thornburg LLP

(57) ABSTRACT

A shut-off valve apparatus has a valve body and a valve member coupled to the valve body. The valve member is movable between a first position blocking material flow through the valve body and a second position permitting material flow through the valve body. A pneumatic actuator receives pressurized air to move the valve member from the first position to the second position. A pneumatic exhaust controller controls the flow of pressurized air into and out of the pneumatic actuator.

42 Claims, 11 Drawing Sheets

U.S. PATENT DOCUMENTS

| | | |
|---|---|---|
| 4,749,300 A | 6/1988 | Berger et al. |
| 4,759,329 A | 7/1988 | Nobuo et al. |
| 4,759,529 A | 7/1988 | Berger et al. |
| 4,877,049 A | 10/1989 | Fornasari |
| 4,883,091 A | 11/1989 | Weiler et al. |
| 4,898,203 A | 2/1990 | Kobelt |
| 5,159,961 A | 11/1992 | Snetting et al. |
| 5,163,353 A | 11/1992 | Horstmann et al. |
| 5,267,721 A | 12/1993 | Stroh |
| 5,279,322 A | 1/1994 | Nakamura et al. |
| 5,465,746 A | 11/1995 | Ebbing |
| 5,579,807 A | 12/1996 | Kohler |
| 5,615,710 A | 4/1997 | Sato |
| 5,699,829 A | 12/1997 | Weiler, Jr. et al. |
| 5,799,561 A | 9/1998 | Wetzel et al. |
| 5,850,853 A | 12/1998 | Ohmi et al. |
| 5,915,410 A | 6/1999 | Zajac |
| 5,918,631 A | 7/1999 | Weiler, Jr. et al. |
| 5,927,324 A | 7/1999 | Russell et al. |
| 6,062,248 A | 5/2000 | Boelkins |
| 6,089,531 A | 7/2000 | Young |
| 6,276,257 B1 | 8/2001 | Hellemann |
| 6,318,396 B1 | 11/2001 | Haselden, Jr. et al. |
| 6,325,097 B1 | 12/2001 | Gallant et al. |
| 6,367,506 B1 * | 4/2002 | Takagi et al. ............ 251/30.04 |

OTHER PUBLICATIONS

Maxon Corporation Bulletin 6500, *Maxon "Modular" Special Service Valves*,© Aug. 1992.

Maxon Corporation Bulletin 7000, *Flow Control Valves*, © Oct. 1992.

Maxon Corporation Bulletin 7500, *Model "LT" OMNO–RATIO® Oil Control Regulators*, © Aug. 1985.

Maxon Corporation Bulletin 8000, *Metal–to–Metal Seated MAXON® Valves*, © Feb. 1986.

Maxon Corporation Bulletin 8100, *MAXON200 Gas Shut–Off Valves*, © Feb. 1986.

Maxon Corporation Bulletin 8200, *MAXON® Oil Shut–Off Valves*, © Feb. 1986.

Maxon Corporation Bulletin 8400, *MAXON® Series STO® Vent Valves*, © Feb. 1986.

Maxon Corporation Bulletin 6100, *MAXON Shut–Off and Vent Valves*, © Oct. 1992.

Office Action dated Feb. 5, 2004, issued in patent application Ser. No. 10/162,448, filed Jun. 4, 2002.

Office Action dated Mar. 18, 2004, Issued in patent application Ser. No. 10/162,359, filed Jun. 4, 2002.

* cited by examiner

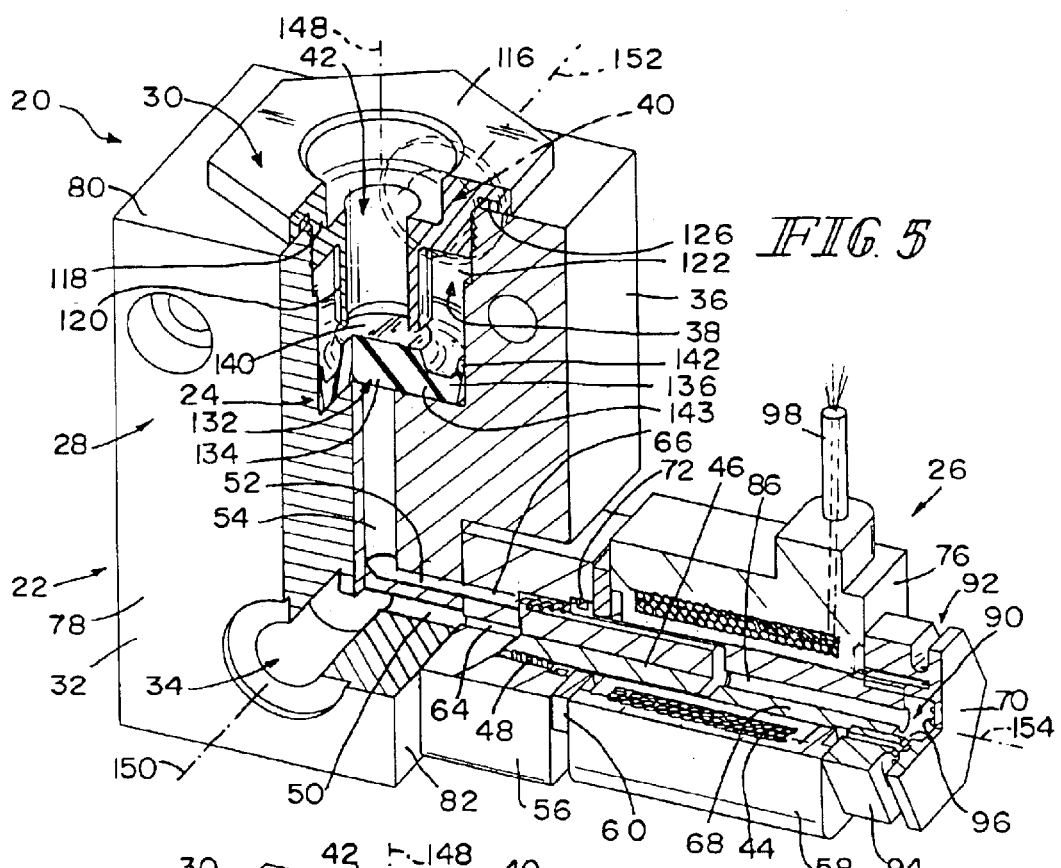
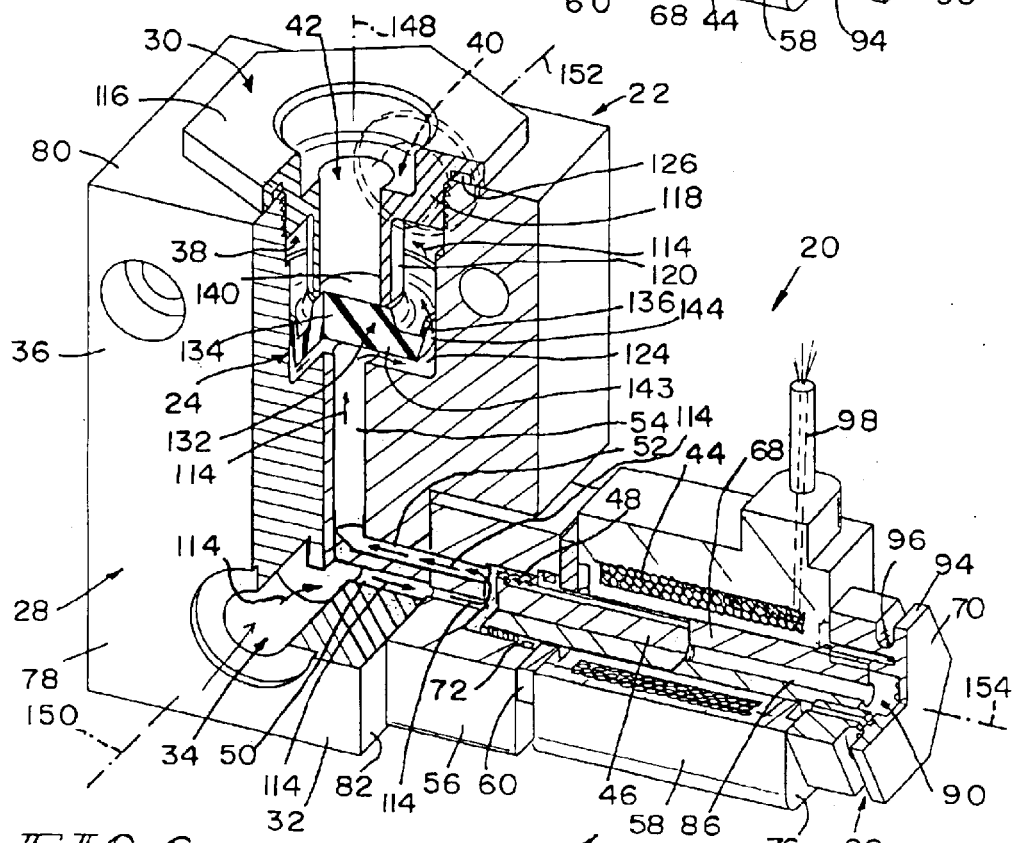

SHUT-OFF VALVE APPARATUS

BACKGROUND AND SUMMARY

The present disclosure relates to a shut-off valve apparatus and particularly to a shut-off valve apparatus having a pneumatic actuator that moves a valve between an opened and a closed position. More particularly, the present disclosure relates to a shut-off valve apparatus having a pneumatic exhaust controller that operates to control the movement of pressurized air into and out of the pneumatic actuator.

Shut-off valves that open and close to control material flow in a conduit or piping system are known. The opening and closing of some known shut-off valves are controlled by pneumatic or electrical signals. Some conventional shut-off valves, such as those included in piping systems though which combustible fuel is delivered, are configured to close very rapidly. Rapid closing in such valves is desirable, for example, when an alarm condition is present or if electrical or pneumatic inputs to the valve are severed or otherwise lost.

According to the present disclosure, a shut-off valve apparatus has a valve body and a valve member coupled to the valve body. The valve member is movable between a first position blocking material flow through the valve body and a second position permitting material flow through the valve body. A pneumatic actuator receives pressurized air to move the valve member from the first position to the second position. A pneumatic exhaust controller controls the flow of pressurized air into and out of the pneumatic actuator.

In illustrative embodiments, the pneumatic exhaust controller comprises a manifold having a first portal coupled to a source of pressurized air, a second portal, and an exhaust portal. The pneumatic exhaust controller has regulator means coupled to the manifold for closing the exhaust portal in response to pressurized air from the air source being communicated to the regulator means through the first portal and for passing pressurized air from the pressurized air source to the second portal when pressurized air from the source is communicated to the regulator means through the first portal.

Also in the illustrative embodiments, an electrical actuator, such as a solenoid valve, is coupled to the manifold and is operable to block and unblock pneumatic communication between the first portal and both the second portal and the exhaust portal. In one of the illustrative embodiments, a check valve is coupled to the manifold and the regulator means comprises a diaphragm and a guide coupled to the diaphragm. In this embodiment, the manifold has a guide-receiving passage that receives a portion of the guide. As the regulator means moves relative to the manifold block, the guide maintains proper alignment of the diaphragm relative to the manifold.

Additional features will become apparent to those skilled in the art upon consideration of the following detailed description of illustrative embodiments exemplifying the best mode of carrying out the pneumatic exhaust controller as presently perceived.

BRIEF DESCRIPTION OF THE DRAWINGS

The detailed description particularly refers to the accompanying figures in which:

FIG. 5 is a perspective view of a first embodiment of the pneumatic exhaust controller, with portions broken away, showing a manifold block, a manifold cap coupled to a top portion of the manifold block, a portion of the manifold cap being received in a chamber formed in the manifold block, a diaphragm situated in the chamber beneath the manifold cap, and a solenoid valve coupled to a lower portion of the manifold block;

FIG. 6. is a perspective view, similar to FIG. 5, showing the solenoid valve being energized to allow pressurized air to flow into a first portal formed in the manifold block, past an end surface of a plunger of the solenoid valve, and upwardly through a vertical flow passage formed in the manifold block, the diaphragm being moved upwardly by the pressurized air to engage the manifold cap to block an exhaust portal formed in the manifold cap, and the pressurized air flowing past an outer peripheral valve portion of the diaphragm to reach a second portal (in phantom) formed in the manifold block;

DETAILED DESCRIPTION OF THE DRAWINGS

Figures 1, 2:
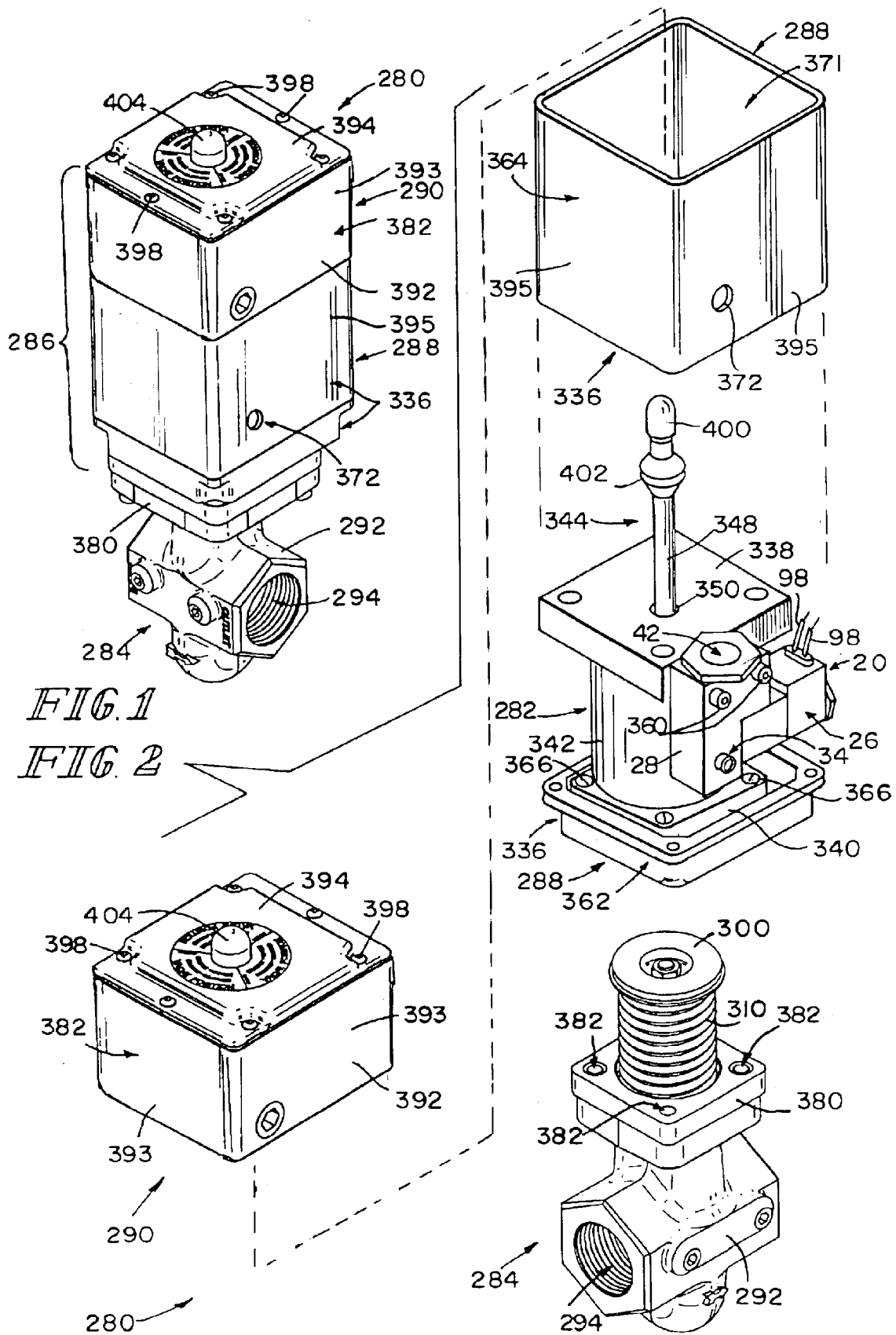
FIG. 1 is a perspective view of a shut-off valve apparatus according to this disclosure showing the shut-off valve apparatus having a main valve module, a pneumatic actuator module above the main valve module, and an electronics module above the pneumatic actuator module.
FIG. 2 is an exploded perspective view of the shut-off valve apparatus of FIG. 1 showing the electronics module in the lower left corner of the page, a tubular housing of the pneumatic actuator module in the upper right corner of the page, a pneumatic actuator beneath the tubular housing, a pneumatic exhaust controller coupled to a top plate of the pneumatic actuator, and the main valve module beneath the pneumatic actuator.

A shut-off valve assembly 280, shown in FIGS. 1–4 has a shut-off valve module 284 and an operator 286 that moves shut-off valve module 284 between opened and closed positions. Operator 286 sets atop module 284 as shown in FIG. 1. Operator 286 comprises a pneumatics module 288 to which module 284 couples and an electronics module 290 situated above module 288. Thus, pneumatics module 288 is situated between electronics module 290 and shut-off valve module 284. Module 288 of operator 286 includes a pneumatic actuator 282 which is actuated by pressurized air. Module 288 of operator 286 further includes a pneumatic exhaust controller 20 (or alternatively, a controller 220) that operates as described more fully below to route pressurized air into pneumatic actuator 282 to move module 284 to the opened position and to exhaust pressurized air from pneumatic actuator 282 to move module 284 to the closed position.

Figure 3:
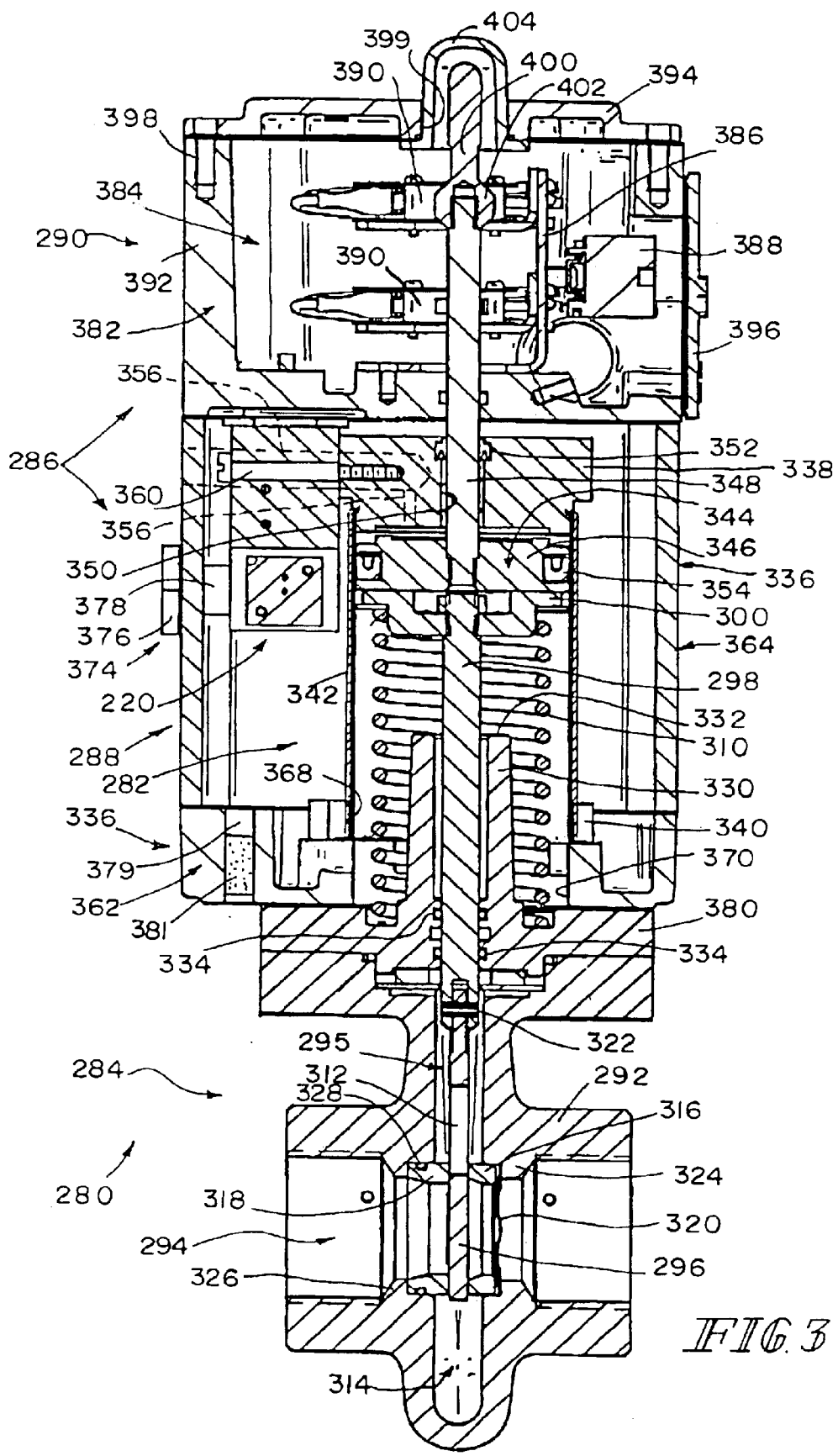
FIG. 3 is a sectional view of the shut-off valve apparatus of FIG. 1, taken through a vertical central axis of the shut-off valve apparatus, showing a piston of the pneumatic actuator in a raised position and a gate of the main valve module biased by a coil spring upwardly into a closed position blocking a horizontal passage formed in a valve body of the main valve module.
Figure 4:
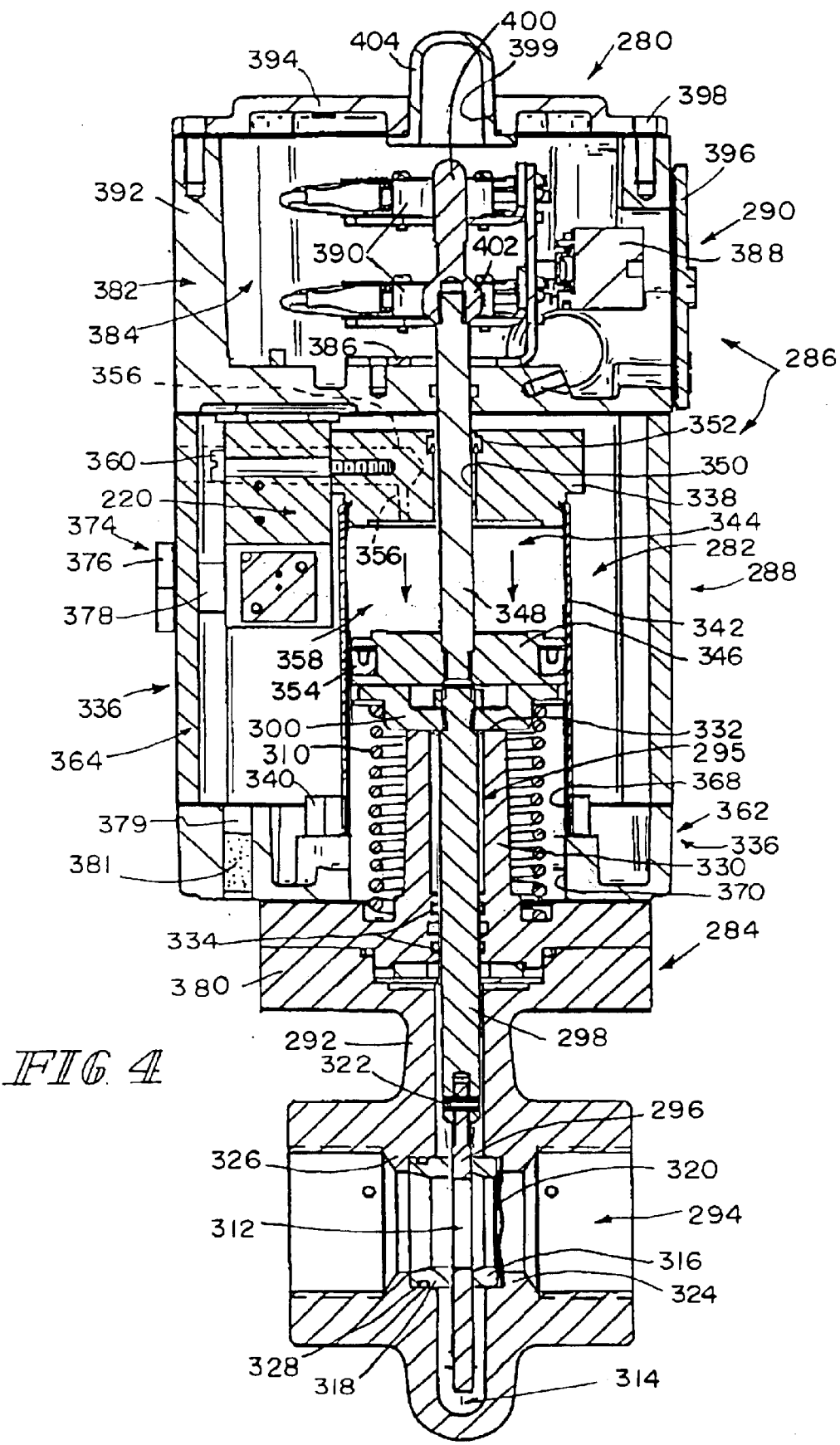
FIG. 4 is a sectional view of the shut-off valve apparatus, similar to FIG. 3, showing pressurized air being introduced through the pneumatic exhaust controller into a top region of a cylinder of the pneumatic actuator, the piston being forced downwardly by receipt of the pressurized air in the top region of the cylinder, the downward movement of the piston compressing the coil spring and moving the gate to an opened position unblocking the horizontal passage formed in the valve body.

Module 284 has a valve body 292 which is formed to include a horizontal passage 294 extending therethrough as shown in FIGS. 1–4. Valve body is also formed to include a vertical passage 295 that extends upwardly from passage 294 as shown in FIGS. 3 and 4. Module 284 further comprises a rod 298 that extends upwardly through passage 295, a gate 296 coupled to a lower portion of rod 298, a disk 300 coupled to an upper portion of rod 298, and a coil spring 310 situated between valve body 292 and disk 300. Rod 298 and gate 296 are movable between a raised position, shown in FIG. 4, in which material is prevented from flowing through passage 294 and a lowered position, shown in FIG. 4, in which material is permitted to flow through passage 294. The word "material" in this disclosure is intended to cover all types of gases, liquids, and solid materials, including granular materials, as well as combinations of these, that are capable of flowing through a passage. Spring 310 serves as a biaser that biases rod 298 and gate 296 to toward the raised position.

Gate 296 is a plate-like element having an opening 312 extending therethrough as shown in FIGS. 3 and 4. When gate 296 is in the lowered position, shown in FIG. 4, opening 312 is aligned with passage 294 and a blocking portion of gate 296, which is the portion of gate 296 beneath opening 312, is received in a chamber 314 that is formed in valve body 292 beneath passage 292. When gate 296 is in the raised position, shown in FIG. 3, the blocking portion of gate 296 is situated in passage 294 to block the flow of material through passage 294.

Illustrative module 284 is sometimes referred to as a "gate valve." In lieu of the illustrative gate valve of FIGS. 1–4, it is within the scope of this disclosure for module 284 of shut-off valve assembly 280 to be configured as a ball valve, a flapper valve, a needle valve, a plug valve, or any other suitable type of valve capable of moving to open and close passage 294 or a similar passage of appropriate configuration.

The lower portion of rod 298 is slotted and the upper portion of gate 296 is received in the slot of rod 298 as shown in FIGS. 3 and 4. Gate 296 is coupled to the lower portion of rod 298 by a pin 322 that extends through the lower portion of rod 298 and through the upper portion of gate 296. Illustrative module 284 has a first valve ring 316 situated in passage 294 on one side of gate 296 and a second valve ring 318 situated in passage 294 on the other side of gate 296. A wavy washer or spring 320 is compressed between a first shoulder 324 of valve body 292 and first valve ring 316. Spring 320 acts through ring 316 and through gate 296, which floats axially on pin 322, to bias second valve ring 318 against a second shoulder 326 of valve body 292. Thus, gate 296 is sandwiched between rings 316, 318. Spring 320 imparts a sufficient amount of force on rings 316, 318 and gate 296 so that rings 316, 318 sealingly engage gate 296. An o-ring 328 is provided at the interface between an outer periphery of ring 318 and valve body 292 to further seal passage 294 when gate 296 is in the raised position.

Valve body 292 has a cylindrical wall 330 that surrounds and defines an upper portion of passage 295 as shown in FIGS. 3 and 4. Cylindrical wall 330 extends upwardly into an interior region of coil spring 310 and terminates at an upwardly facing surface 332 as shown best in FIG. 3. Rod 298 extends from gate 296 upwardly through cylindrical wall 220 and supports disk 300 above surface 332. When rod 298 and gate 296 are in the raised position, disk 300 is spaced apart from surface 332. When rod 298 and gate 296 are in the lowered position, disk 300 engages surface 332. Thus, surface 332 of cylindrical wall 330 serves as a stop that limits the amount of downward movement of disk 300, rod 298, and gate 296. A pair of o-rings 334 are coupled to valve body 292 and engage an outer surface of rod 298 to pneumatically seal the portion of passage 295 above o-rings 334 from the portion of passage 295 below o-rings 334.

Pneumatics module 288 comprises pneumatic actuator 282, controller 20 (or controller 220 in alternative embodiments), and a housing 336 as shown in FIGS. 1–4. Illustrative pneumatic actuator 282 has a top plate 338, a bottom plate 340, and a cylindrical wall 342 extending vertically between plates 338, 340. Actuator 282 further comprises a piston 344 having a piston head 346 situated between plates 338, 340 in an interior region of cylindrical wall 342 and a piston rod 348 extending upwardly from piston head 346 through an opening 350 formed in top plate 338 as shown in FIGS. 3 and 4. Actuator 282 also has a first seal 352, which is coupled to top plate 338 and which engages an outer surface of piston rod 348, and a second seal 354, which is coupled to piston head 346 and which engages an inner surface of cylindrical wall 342.

Top plate 338 has a pneumatic passage 356, shown in FIGS. 3 and 4 (in phantom), through which pressurized air flows when either entering or exiting a space 358, shown best in FIG. 4, defined between piston head 346 and top plate 338. Controller 20 (or alternatively, controller 220) is coupled to top plate 338 with suitable couplers, such as illustrative bolts 360, so that a portal 40 of a manifold block 28 of controller 20 is in pneumatic communication with passage 356. Housing 336 comprises a bottom piece 362 and a tubular upper piece 364 that couples to bottom piece 336. Bottom plate 340 of actuator 282 couples to bottom piece 362 of housing 336 with suitable couplers, such as bolts 366.

The bottom portion of cylindrical wall 342 is received in a large opening defined by a cylindrical surface 368 that extends through bottom plate 340 as shown in FIGS. 3 and 4. Bottom piece 362 of housing 336 has a cylindrical surface 370 that extends therethrough and that is aligned with the interior surface of cylindrical wall 342 of actuator 282. Upper piece 364 of housing 336 is coupled to and extends upwardly from bottom piece 362. Controller 20 and the majority of actuator 282 are situated in an interior region 371 of upper piece 364. In addition, upper piece 364 has an opening 372, shown in FIGS. 1 and 2, that aligns with a portal 34 of controller 20 (or alternatively, controller 220). A fitting 374, shown in FIGS. 3 and 4, has a hexagonal portion 376 that abuts piece 364 and a tubular portion 378 that extends from hexagonal portion 376 through opening 372 into pneumatic communication with portal 34.

Valve body 292 has a square-shaped flange 380 that couples to bottom piece 362 of housing 336 with suitable couplers, such as bolts (not shown). Bolt-receiving apertures 382 are formed in the corner regions of flange 380 which permits shut-off valve module 284 to be coupled to pneumatics module 288 in any one of four orientations. For example, one orientation of module 282 relative to module 288 is shown in FIGS. 1, 3, and 4 and another orientation of module 282 relative to module 288 is shown in FIG. 2.

Disk 300, along with portions of rod 298 and spring 310, are received in the interior region of cylindrical wall 342 of actuator 282 beneath piston head 346 as shown in FIGS. 3 and 4. Spring 310 biases disk 300 into contact with piston head 346. In addition, cylindrical wall 330 of valve body 292 extends upwardly through the opening defined by cylindrical surface 370 of piece 362 into the interior region of cylindrical wall 342 of pneumatic actuator 282.

When piston 344 is in a raised position, shown in FIG. 3, and pressurized air is introduced into space 358 through controller 20, piston 344 moves downwardly from the raised position to a lowered position, shown in FIG. 4. As piston 344 moves from the raised position to the lowered position, piston head 346 pushes disk 300, rod 298, and gate 296 downwardly against the bias of spring 310 from the raised position to the lowered position to open shut-off valve module 284. Contact between disk 300 and surface 332 of cylindrical wall 330 limits the amount of downward movement of piston 344 relative to cylindrical wall 342 of actuator 282. Module 284 remains open so long as space 358 is pressurized by an amount that overcomes the bias of spring 310.

When a solenoid valve 26 of controller 20 (or controller 220) is de-energized, as described more fully below, the source of pressurized air is decoupled from space 358. After the source of pressurized air is decoupled from space 358, spring 310 forces disk 300 and piston 344 upwardly which, in turn, forces the air extant in space 358 out of actuator 282, through passage 356, into controller 20 (or controller 220) through portal 40, and then out of controller 20 (or controller 220) through exhaust portal 42 into the interior region 371 of piece 364. The air in interior region 371 communicates with the ambient environment around assembly 280 through a vertical passage 379 formed in bottom piece 362 of housing 336. A filter 381 is situated in passage 379 as shown in FIGS. 3 and 4. The air in space 358 exhausts rapidly out of actuator 282 through controller 220 when solenoid valve 26 is de-energized so that shut-off valve module 282 closes quickly.

Electronics module 290 has a housing 382 with an interior region 384, a bracket 386 coupled to housing 382 in interior region 384, an electrical connector 388 coupled to bracket 386, and one or more limit switches 390 coupled to bracket 386 as shown in FIGS. 3 and 4. Housing 382 comprises a main body 392, a cover plate 394, and an access plate 396. Cover plate 394 couples to main body 392 with suitable couplers, such as bolts 398, to cover an open top of main body 392. Access plate 396 couples to main body 392 with suitable couplers (not shown) to cover an open side of main body 392. Main body 392 is coupled to the top of upper piece 364 of housing 336 of module 288.

Electronics module 290 fits on top of pneumatics module 288 so that vertical outer surfaces 393 of main body 392 are substantially coplanar with associated vertical outer surfaces 395 of piece 364 of housing 336 that lie thereunder as shown, for example, in FIG. 1. In alternative embodiments, main body 392 of module 288 and piece 364 of housing 336 are formed as an integral unit. Illustratively, outer surfaces 393, 395 are substantially square-shaped in horizontal cross section. However, it is within in the scope of this disclosure for modules 288, 290 to have other configurations such that the horizontal cross sections of outer surfaces 393, 395 are, for example, circular, elliptical, triangular, rectangular, hexagonal, octagonal, and so on. In addition, it is within the scope of this disclosure for surfaces 393 not to be substantially coplanar with surfaces 395. Thus, housing 336 and housing 382 may be configured in any shape and still be within in the scope of this disclosure so long as modules 288, 290 are able to couple together to form an operator that is capable of moving shut-off valve module 284 between the opened and closed positions.

Access plate 396 is removable from main body 392 so that connector 388 is accessible for coupling with a mating connector (not shown). Electrical signals are communicated to and from shut-off valve assembly 280 through connector 388. For example, connector 388 is coupled electrically via cables 98 to solenoid valve 26 and electrical signals to energize and de-energize solenoid valve 26 are communicated to cables 98 through connector 388. Cables 98 are routed from connector 388 through interior region 384 of housing 382 and downwardly into interior region 371 of piece 364. Limit switches 390 are coupled electrically to connector 388 and provide signals indicative of the position of piston 344.

An indicator tip 400 is coupled to the top of piston rod 348 as shown in FIGS. 2–4. Tip 400 has a cam portion 402 that wipes against movable members (not shown) of limit switches 390 to move switches 390 from an OFF state to an ON state. When piston 344 is in the raised position, an upper limit switch 390 is in the ON state and a lower limit switch 390 is the OFF state. When piston 344 is in the lowered position, the upper limit switch 390 is in the OFF state and the lower limit switch 390 is in the ON state. The positions of switches 390 is communicated electrically through connector 388 to valve control equipment, such as, for example, a programmable logic controller.

Cover plate 394 has a cylindrical edge 399 defining an opening in cover plate 394 as shown in FIGS. 3 and 4. Housing 382 of module 290 has a transparent dome 404 that is coupled to cover plate 394 and that extends through the opening defined by edge 399 as also shown in FIGS. 3 and 4. When piston 344 is in the raised position, the upper portion of tip 400 is present in dome 404 and when piston 344 is in the lowered position, the upper portion of tip 400 is absent from dome 404. Thus, the presence or absence of tip 400 in dome 404 provides a visual indication of whether valve module 284 is closed or opened, respectively.

Referring now to FIGS. 5–8, pneumatic exhaust controller 20 comprises a manifold 22, a regulator 24 coupled to manifold 22, and a solenoid valve 26 coupled to manifold 22. Manifold 22 includes a manifold block 28 and a manifold cap 30 coupled to block 28. Block 28 has a lower portion 32 that is formed to include first portal 34 and an upper portion 36 that is formed to include both a chamber 38 and second portal 40. Cap 30 is coupled to upper portion 36 of block 28 and is formed to include an exhaust portal 42. Regulator 24 is situated in chamber 38 between block 28 and cap 30.

First portal 34 is connectable to a source of pressurized air (not shown), such as, for example, a pump, a compressor, a reservoir, a tank, or any other apparatus capable of delivering pressurized air to controller 20. The term "air," as used in this disclosure, including in the claims, is intended to cover gases of all types, such as ambient air, oxygen, nitrogen, carbon dioxide, and hydrogen, just to name a few examples. Second portal 40 is coupled pneumatically to space 358 of actuator 282 via passage 356. Exhaust portal 42 communicates pneumatically with interior region 371 of housing 336. In addition, chamber 38 communicates pneumatically with second portal 40 and with exhaust portal 42.

Figure 7:
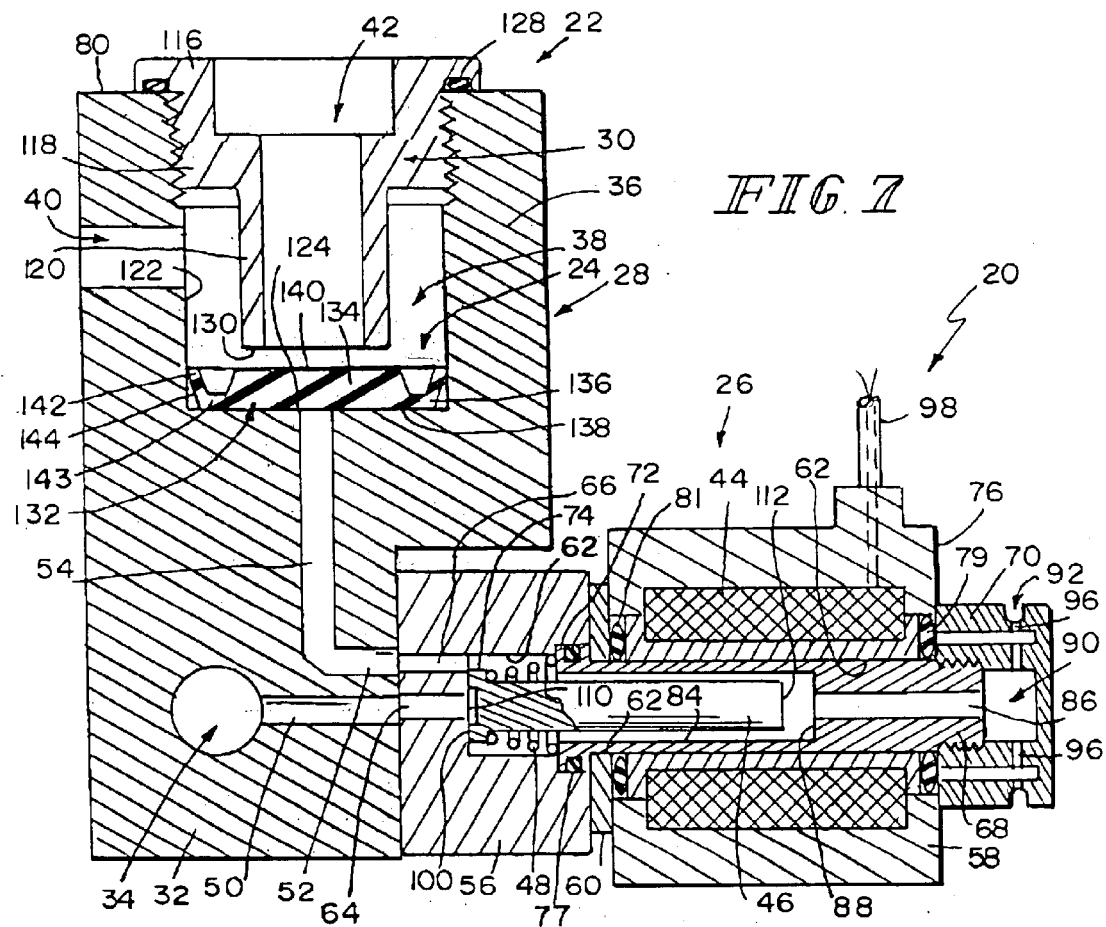
FIG. 7 is a diagrammatic cross sectional view of the pneumatic exhaust controller of FIG. 5 showing the plunger in a first position blocking pneumatic communication between the first portal and the vertical flow passage and showing the diaphragm spaced apart from the manifold cap and resting upon an end surface that defines the bottom of the chamber formed in the manifold block.
Figure 8:
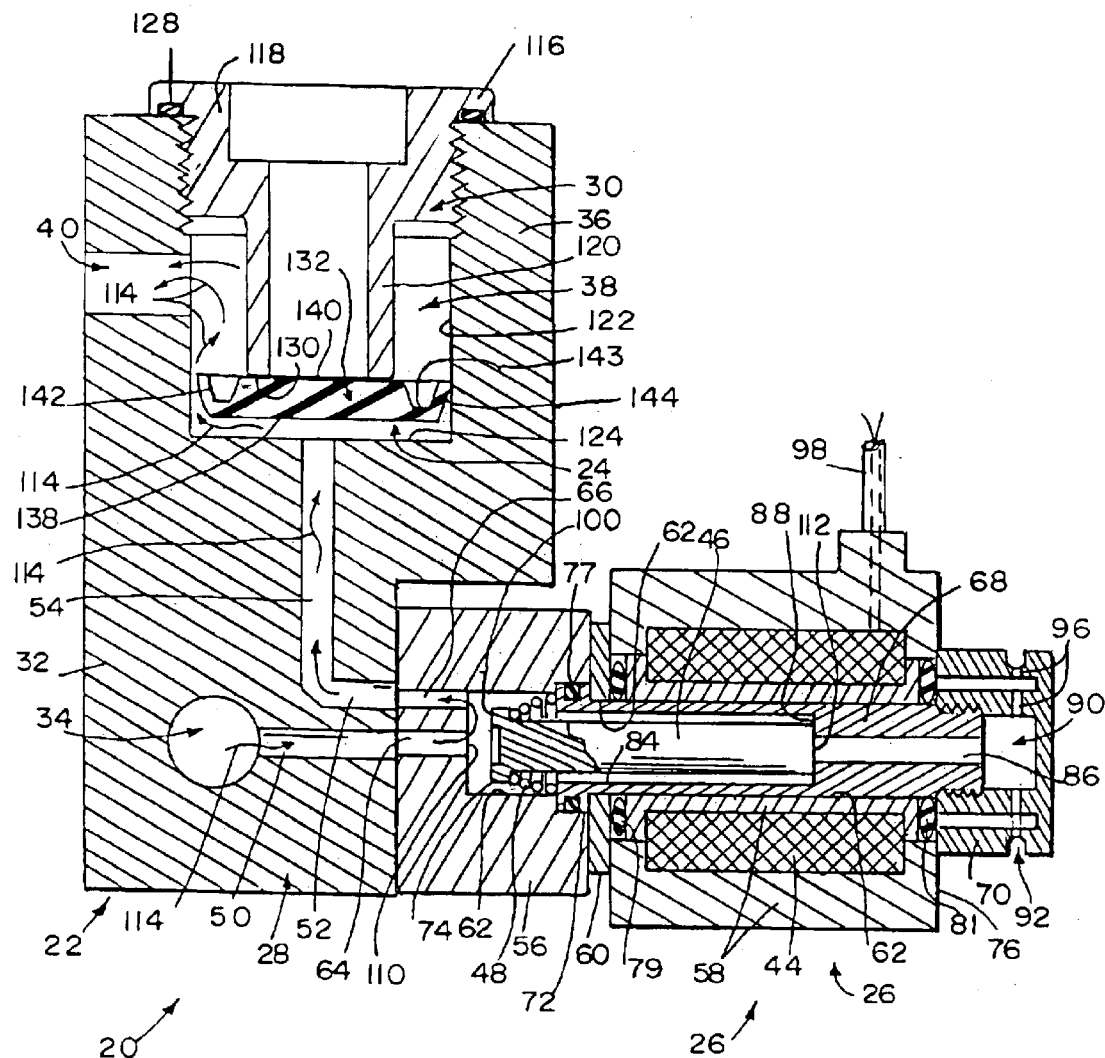
FIG. 8 is a diagrammatic cross sectional view, similar to FIG. 7, showing the plunger in a second position allowing pneumatic communication between the first portal and the vertical flow passage, the diaphragm being moved upwardly by the pressurized air so that a closure disk portion of the diaphragm engages the manifold cap to block the exhaust portal, and the pressurized air flowing past the valve portion of the diaphragm and out of the second portal.

Solenoid valve 26 and regulator 24 operate to control the flow of pressurized air through manifold 22. When solenoid valve 26 is de-energized, pressurized air is prevented from entering first portal 34 and flowing through manifold block 28 as shown in FIGS. 5 and 7. When solenoid valve 26 is energized, pressurized air is able to flow through manifold block 28 and through a portion of solenoid valve 26 as shown in FIGS. 6 and 8. Regulator 24 is located in chamber 38 above portal 34 and beneath both manifold cap 30 and portal 40. Thus, pressurized air flowing through block 28 from portal 34 to portal 40 flows upwardly through block 28 and passes by regulator 24.

The pressurized air flowing upwardly in block 28 causes regulator 24 to move from a first position, shown in FIGS. 5 and 7, to a second position, shown in FIGS. 6 and 8. Regulator 24 blocks pneumatic communication between chamber 38 and exhaust portal 42 when in the second position. After the pressurized air flowing upwardly moves regulator 24 to the second position, regulator 24 operates to pass the pressurized air further upwardly to reach the portion of chamber 38 above regulator 24. When regulator 24 is in the second position, the pressurized air that flows upwardly into the portion of chamber 38 above regulator 24 then exits block 28 through portal 40.

Figure 9:
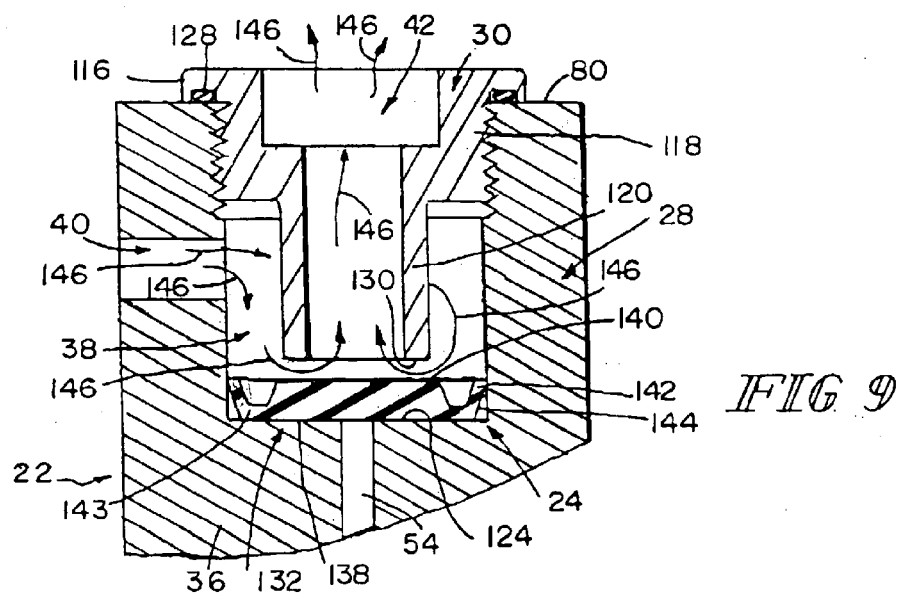
FIG. 9 is a diagrammatic cross sectional view of a portion of the exhaust controller of FIG. 5 showing the diaphragm at the bottom of the chamber resting upon the end surface to block the vertical flow passage and showing pressurized air entering the chamber through the second portal and then exhausting out of the chamber upwardly through the exhaust portal.

If solenoid valve 26 is de-energized when regulator 24 is in the second position, the portion of chamber 38 beneath regulator 24 depressurizes and regulator 24 moves from the second position back to the first position thereby unblocking pneumatic communication between chamber 38 and exhaust portal 42. If portal 40 is exposed to pressurized air after regulator 24 moves back to the first position, the pressurized air moves through portal 40 into chamber 38 and then upwardly through exhaust portal 42 as shown in FIG. 9. When regulator 24 is in the first position, pressurized air will exhaust through portal 42 until the pressure in chamber 38 and portal 40 reach equilibrium with the pressure of the ambient environment in interior region 371 of housing 336.

If regulator 24 is in the first position and the pressure beneath regulator 24 exceeds the pressure above regulator 24 by a threshold amount, then regulator 24 moves from the first position to the second position. If regulator 24 is in the second position and the pressure beneath regulator 24 does not exceed the pressure above regulator pressure above regulator 24 by the threshold amount, then regulator 24 moves from the second position to the first position. Regulator 24 is biased by gravity toward the first position. Therefore, when regulator 24 is in the second position, if the pressure beneath regulator 24 is equal to the pressure above regulator 24 or if the pressure beneath regulator 24 is greater than the pressure above regulator 24 but less than the threshold amount to maintain regulator 24 in the second position, then regulator will move from the second position to the first position due to gravitational forces acting on regulator 24.

A central region of the upper surface 140 of regulator 24 is exposed to ambient pressure extant in portal 42 when regulator is in the second position and the upper surface of an annular outer region of regulator 24 is exposed to the pressure extant in chamber 38. Thus, the pressure above regulator 24 when regulator 24 is in the second position is considered to be the average pressure to which the central region and the annular outer region of the upper surface of regulator 24 is exposed. When regulator 24 is in the second position, the entire bottom surface 138 of regulator 24 is exposed to the pressure in chamber 38. Thus, when regulator 24 is in the second position and chamber 38 is pressurized by a sufficient amount, regulator 24 is maintained in the second position, even if a static condition exists having no air flow through chamber 38, because the average pressure to which the bottom surface of regulator 24 is exposed exceeds the average pressure to which the top surface of regulator 24 is exposed.

Based on the preceding discussion, it is understood that two conditions must be met in order for regulator 24 to move from the first position to the second position so that pressurized air is able to pass from portal 34 through manifold 22 and solenoid valve 26 and out of manifold 22 through portal 40. First, solenoid valve 26 must be energized by an appropriate electrical signal and second, an appropriate amount of pneumatic pressure must be applied to portal 34. It is also understood from the preceding discussion that the position of regulator 24 is determined by the pneumatic conditions to which regulator 24 is exposed. Furthermore, the pressurized air from the pneumatic source that causes regulator 24 to move from the first position to the second position, and that subsequently maintains regulator 24 in the second position, is the same pressurized air that goes on to exit portal 40 and operate pneumatic actuator 282.

Manifold block 28 is formed to include a first flow passage 50, a second flow passage 52, and a third flow passage 54 as shown, for example, in FIGS. 5 and 7. Passage 50 communicates pneumatically with portal 34 and extends horizontally from portal 34 through lower portion 32 of block 28. Passage 52 communicates pneumatically with passage 54 and extends horizontally from passage 54 through lower portion 32 of block 28 in parallel relation with passage 50. Passage 54 extends vertically in block 28 between chamber 38 and passage 52. Portals 34, 40 are adapted to connect to appropriate fittings or couplers, such as fitting 374 of other suitable threaded fittings or quick connect couplers having passages therethrough, to connect controller 20 to the source of pressurized air and to actuator 282, respectively.

In the illustrative embodiment of controller 20, portal 34 extends horizontally into block 28 from a front surface 78 of block 28, portal 40 extends horizontally into block 28 from a back surface (unnumbered in the FIGS.) of block 28, and chamber 38 extends vertically into block 28 from a top surface 80 of block 28 as shown in FIGS. 5 and 6. It should be noted that the location of portal 40 has been moved in FIGS. 7–9 for the sake of clarity to permit the relevant flow paths of pressurized air through controller 20 to be illustrated in a single cross sectional plane. Also in the illustrative embodiment of controller 20, passages 50, 52 extend into block 28 from a side surface 82 of the lower portion 32 of block 28. It is within the scope of this disclosure for manifold 22 to have a manifold block with other configurations and for portals 34, 40, chamber 38, and passages 50, 52 to extend into the manifold block at other locations and at orientations other than those shown in FIGS. 5–9. Thus, the term "block" as used in this disclosure, including in the claims, is intended to cover bodies that are cylindrical, spherical, pyramidal, conical, or any other suitable three-dimensional shape allowing formation of portals, passages, and chambers therein.

Solenoid valve 26 comprises a first body 56, a second body 58, and a separation disk 60 interposed between bodies 56, 58 as shown in FIGS. 5 and 6. Bodies 56, 58 and disk 60 are each formed to include a plunger-receiving bore 62 as shown in FIGS. 7 and 8. In addition, body 56 is formed to include a first passage 64 and a second passage 66. Each of passages 64, 66 communicates pneumatically with bore 62 of body 56. In addition, each of passages 64, 66 extends horizontally from bore 62 through body 56. Body 56 of solenoid valve 26 is mounted to lower portion 32 of block 28 so that passage 64 formed in body 56 communicates pneumatically with passage 50 formed in block 28 and so that passage 66 formed in body 56 communicates pneumatically with passage 52 formed in block 28.

Solenoid valve 26 has a plunger 46, portions of which are situated within respective bores 62 of bodies 56, 58 and disk 60 as shown in FIGS. 7 and 8. Solenoid valve 26 further comprises a spring 48 situated within bore 62 of body 56, a member or vent tube 68, and a vent cap 70. An annular end portion 72 of vent tube 68 is received in bore 62 of body 56. Spring 48 is maintained in a state of compression between end portion 72 of vent tube 68 and an annular shoulder portion 74 of plunger 46 as shown in FIGS. 7 and 8. Disk 60 is fastened to body 56 with any suitable fastening means, such as, for example, adhesive, welding, bolts, pins, snaps, fingers, tabs or the like, to trap end portion 72 of vent tube 70 against body 56.

Vent tube 68 extends from body 56 through bore 62 of disk 60 and through bore 62 of body 58. Thus, vent tube 68 is supported in a cantilevered manner with respect to manifold 22. A cylindrical threaded portion of vent tube 68 extends outwardly beyond an end surface 76 of body 58 and vent cap 70 threads onto this outwardly extending, distal end portion of vent tube 68. The other portions of member 68 are cylindrical in some embodiments and have shapes other than cylindrical in alternative embodiments. For example, portions of member 68 may have square, rectangular, triangular, hexagonal, etc. cross sections. Vent cap 70 engages end surface 76 of body 58 to clamp body 58 against disk 60. An o-ring 77, shown in FIGS. 7 and 8, is compressed radially between portion 72 of vent tube 68 and body 56. A first annular seal or gasket 79 is compressed axially between body 58 and disk 60 and a second seal or gasket 81 is compressed axially between body 58 and vent cap 70. O-ring 77 and the annular gaskets 79, 81 pneumatically seal the various interfaces between bodies 56, 58, disk 60, vent tube 68, and vent cap 70.

Depending upon the environment or application in which valve assembly 280 is used, other types of solenoid coils, such as a hermetically sealed solenoid coil, may be required by safety regulations in lieu of illustrative solenoid coil 44 which is unsealed. Solenoid coils having intermediate levels of sealing may also be required or desired. Body 58, coil 44, and seals 79, 81 are coupled together and are attachable to and detachable from member 68 as a unit (hereinafter referred to as "coil unit 44, 58, 79, 81"). To replace coil unit 44, 58, 79, 81 with another coil unit having a different type of coil, vent cap 70 is unthreaded from member 69, coil unit 44, 58, 79, 81 is moved axially off of member 68, the new coil unit is placed on member 68, and cap 70 is threaded back onto member 68. Thus, solenoid valve 26 is configured to permit easy attachment and detachment of coil units. When cap 70 is decoupled from member 68 for removal and replacement of the coil unit, the other portions of controller 20 remain assembled together. Of course, during the initial assembly of solenoid valve 26 coil units are not interchanged, but rather, the desired type of coil unit is selected from the various types of coil units available and is mounted onto member 68.

Vent tube 68 has a bore 84 in which a portion of plunger 46 is received as shown in FIGS. 7 and 8. Vent tube 68 also has a vent passage 86 in pneumatic communication with bore 84 and a radially extending shoulder surface 88 extending between bore 84 and passage 86. Vent cap 70 has a vent chamber 90 in pneumatic communication with passage 86 of tube 68, an annular groove 92 formed in a hexagonal outer periphery 94, and a plurality of orifices 96 providing pneumatic communication between chamber 90 and groove 92. One or more cables 98 extend from body 58 of solenoid valve 26. Solenoid valve 26 has a coil 44 to which wires in cables 98 are coupled electrically to carry the electrical signals that energize and de-energized solenoid valve 26.

Plunger 46 is magnetized so that an electrical field created by coil 44 when solenoid valve 26 is energized moves plunger 46 against the bias of spring 48 from a first position, shown in FIGS. 5 and 7, to a second position, shown in FIGS. 6 and 8. When plunger 46 is in the first position, an end surface 100 of plunger 46 is biased by spring 48 into sealing engagement with an inner surface 110 of body 56 to block pneumatic communication between passage 64 and passage 66. When plunger 46 is in the second position, an end surface 112 of plunger 46 is biased by the electrical field of energized coil 44 into sealing engagement with shoulder surface 88 of vent tube 68 to block pneumatic communication between bores 62, 84 and vent passage 86.

When plunger 46 is in the second position, pressurized air is able to move through portal 34, through passage 50 of block 28, through passage 64 of body 56, between end surface 100 of plunger 46 and inner surface 110 of body 56, through passage 66 of body 56, through passage 52 of block 28, and into passage 54 of block 28 as indicated by a series of arrows 114 shown in FIGS. 6 and 8. Sealing engagement between end surface 112 of plunger 46 and shoulder surface 88 of vent tube 68 prevents the pressurized air from flowing through the space between plunger 46 and bore 84 of vent tube 68 and into vent passage 86.

Illustrative manifold cap 30 has a hexagonal top portion 116, a cylindrical wall 120 that defines exhaust portal 42, and a stepped annular portion 118 interconnecting portion 116 and wall 120 as shown in FIGS. 5–9. An outer surface of portion 118, which is located beneath portion 116, is threaded. Block 28 has a substantially cylindrical surface 122 extending downwardly from top surface 80 and an upwardly facing end surface 124 at the bottom of surface 122. Surface 122 cooperates with surface 124 to define chamber 38 in block 28. Vertical flow passage 54 communicates pneumatically with chamber 38 through surface 124 and portal 40 communicates pneumatically with chamber 38 through surface 122.

The upper portion of surface 122 is threaded and mates with the threaded outer surface of portion 118 to couple cap 30 to block 28. Portion 116 of cap 30 has a circular groove 126 in which an o-ring 128 is situated. O-ring 128 is compressed between portion 116 of cap 30 and top surface 80 of block 28 to pneumatically seal the interface between cap 30 and block 28. Portion 118 of cap 30 extends downwardly from portion 116 into chamber 38. Wall 120 of cap 30 extends downwardly from portion 118 further into chamber 38. However, wall 120 terminates in chamber 38 at a downwardly facing end edge 130 which is spaced apart from surface 124. In addition, wall 120 of cap 30 is spaced apart from cylindrical surface 122 of block 28. Thus, an annular space is defined in chamber 38 between wall 120 of cap 30 and surface 122 of block 28 and an axial space is defined in chamber 38 between end edge 130 of wall 120 and surface 124 of block 28.

Regulator 24 is retained in chamber 38 in the axial space defined between end edge 130 and surface 124 as shown in FIGS. 5–9. Illustrative regulator 24 comprises a diaphragm 132 having a closure disk portion 134 and a valve portion 136 coupled to the outer periphery of disk portion 134. Diaphragm 132 has a planar bottom surface 138 and disk portion 134 of diaphragm 132 has a planar upper surface 140. When regulator 24 is in the first position, surface 138 engages surface 124 to block pneumatic communication between passage 54 and both chamber 38 and portals 40, 42. When regulator 24 is in the second position, surface 140 engages end edge 130 to block pneumatic communication between exhaust portal 42 and each of chamber 38, portal 40, and passage 54. Thus, end edge 130 of wall 120 provides a valve seat that faces toward surface 140 of diaphragm 132.

Portion 136 comprises a flexible, annular lip 142 having an outer surface 144 that flares upwardly and outwardly from bottom surface 138. Portion 136 further comprises an annular transition ring 143 that interconnects the outer periphery of disk portion 134 and lip 142. The vertical thickness of disk portion 134 is greater than the vertical thickness of ring 143 of portion 136. In addition, the vertical thickness of disk portion 134 is greater than the thickness of lip 142 in a direction normal to outer surface 144.

Outer surface 144 of lip 142 is substantially frustoconical when lip 142 is in an unflexed configuration. The upper portion of lip 142 defines a circular outer region that engages surface 122 under some pressure conditions and that disengages from surface 122 under other pressure conditions. For example, when regulator 24 is in the first position, the circular outer region of lip 142 sealingly engages cylindrical surface 122. In addition, when regulator 24 moves initially from the first position to the second position due to bottom surface 138 being exposed to pressured air via passage 54, the upper portion of lip 142 rides upwardly on surface 122 while the circular outer region of lip 142 maintains sealing engagement with surface 122.

After surface 142 of disk portion 134 engages edge 130 of wall 120, diaphragm 132 is unable to move vertically upwardly any further which results in an increase in the pressure in the space defined between surfaces 138, 144 of diaphragm 132 and surface 124 of manifold block 28. When the pressure in the space defined between surface 124 and surfaces 138, 144 reaches a threshold amount, the upper portion of lip 142 deflects annularly inwardly away from surface 122 to permit pressurized air to flow past diaphragm 132, into the portion of chamber 38 above diaphragm 132, and out of chamber 38 through portal 40 as indicated by arrows 114 in FIGS. 6 and 8.

When regulator 24 is in the second position sealingly engaging edge 130 of wall 120 and solenoid valve 26 is de-energized to move plunger 46 to the first position blocking pneumatic communication between passage 64 and passage 66, lip 142 flexes annularly outwardly back into sealing engagement with surface 122 and the pressurized air extant in the space between surfaces 138, 144 and surface 124, as wells as the pressurized air extant in passages 54, 64, vents to atmosphere through bore 62 of body 56, bore 84 of vent tube 68, passage 86 of vent tube 68, chamber 90 of vent cap 70, and orifices 96 of vent cap 70. As the pressurized air vents to atmosphere through cap 70, the pressure beneath diaphragm 132 decreases. Once the pressure beneath diaphragm 132 decreases by a threshold amount, regulator 24 moves from the second position vertically downwardly to the first position so that surface 140 of disk portion 134 disengages from end edge 130 of wall 120. After surface 140 disengages from edge 130, if the pressure to which portal 40 is exposed is greater than the pressure to which portal 42 is exposed, then pressurized air will flow through portal 40 into chamber 38 and then out of chamber 38 through portal 42 as indicated by arrows 146 shown in FIG. 9.

As discussed above, regulator 24 comprises a member or diaphragm 132 that moves vertically upwardly to block exhaust portal 42 and that moves downwardly to unblock exhaust portal 42. Surface 122 of block 28 defines a vertical axis 148, shown in FIGS. 5 and 6, along which diaphragm 132 moves. Axis 148 passes through chamber 38, exhaust portal 42, and passage 54. Portal 34 extends along a horizontal axis 150 that is orthogonal to axis 148. Portal 40 extends along a horizontal axis 152 that is orthogonal to axis 148 and that is parallel with, but offset from, axis 150. Plunger 46 of solenoid valve 26 moves along a horizontal axis 154 that is orthogonal to each of axes 148, 150, 152. Bores 62, 84, vent passage 86, and vent chamber 90 each extend along axis 154.

Referring now to FIGS. 10–15, an alternative pneumatic exhaust controller 220 according to this disclosure is provided. Controller 220 comprises some of the same components and features as controller 20 and therefore, where appropriate, like reference numerals are used to denote components or features of controller 220 that are the same or substantially similar to like components or features of controller 20. The three main differences between controller 220 and controller 20 is the configuration of manifold block 22, the configuration of regulator 24, and the inclusion in controller 220 of a check valve 222.

Figure 10:
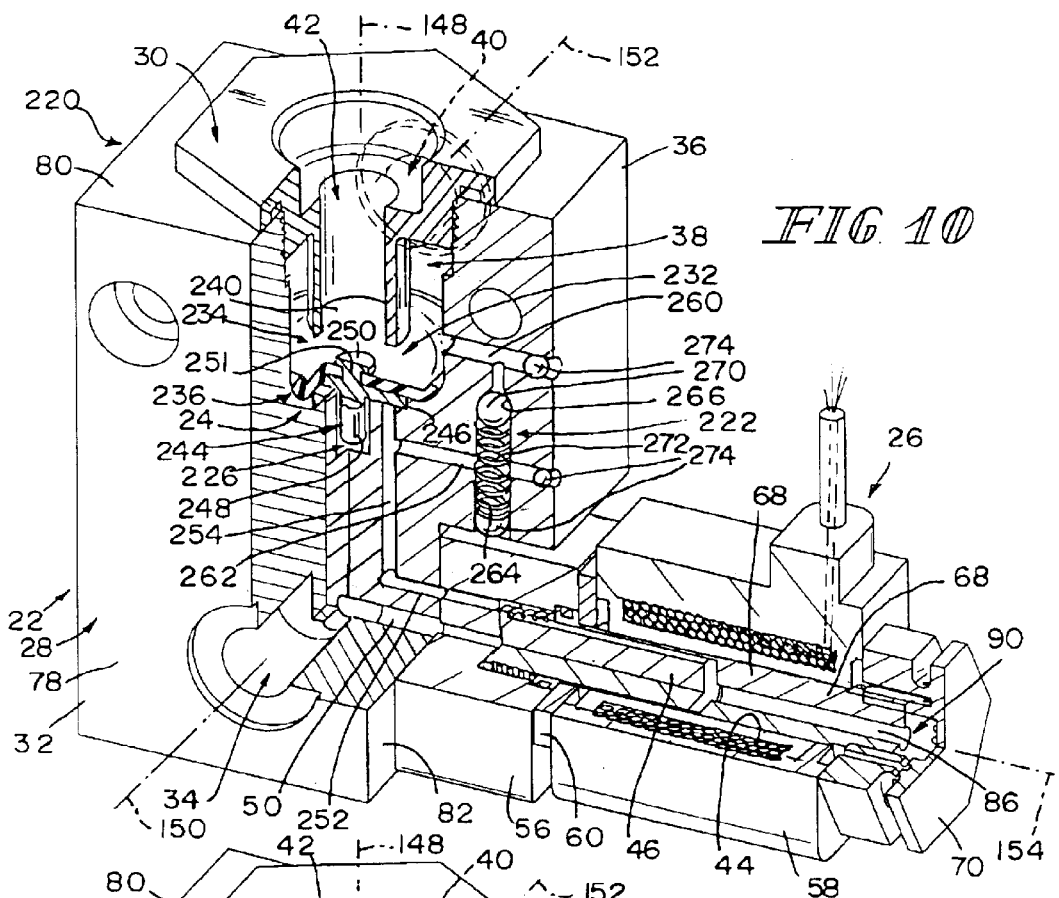
FIG. 10 is a perspective view of a second embodiment of the pneumatic exhaust controller according to this disclosure, with portions broken away, showing a manifold block, a manifold cap coupled to a top portion of the manifold block, a portion of the manifold cap being received in a chamber formed in the manifold block, a diaphragm situated in the chamber beneath the manifold cap, a guide coupled to the diaphragm, a check valve situated in the manifold block to the right of the diaphragm, and a solenoid valve coupled to a lower portion of the manifold block.
Figure 11:
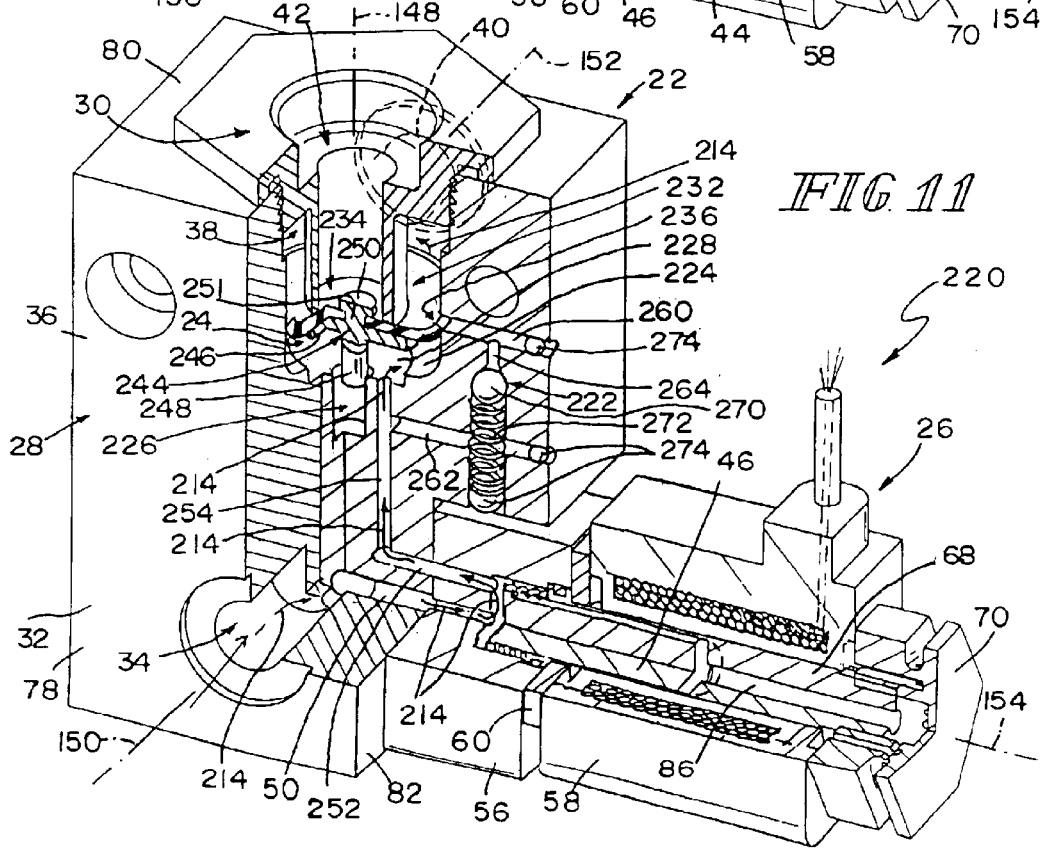
FIG. 11 is a perspective view, similar to FIG. 10, showing the solenoid valve being energized to allow pressurized air to flow into a first portal formed in the manifold block, past an end surface of a plunger of the solenoid valve, and upwardly through a vertical flow passage formed in the manifold block, the diaphragm being moved upwardly by the pressurized air to engage the manifold cap to block an exhaust portal formed in the manifold cap, and the pressurized air flowing past an outer peripheral valve portion of the diaphragm to reach a second portal (in phantom) formed in the manifold block.

Controller 220 comprises a manifold 22, a regulator 24 coupled to manifold 22, and a solenoid valve 26 coupled to manifold 22 as shown, for example, in FIGS. 10 and 11. Manifold 22 of controller 220 includes a manifold block 28 and a manifold cap 30 coupled to block 28 as was the case with controller 20. Solenoid valve 26 of controller 220 and manifold cap 30 of controller 220 are substantially the same as solenoid valve 26 and manifold cap 30, respectively, of controller 20 and therefore, the description above of these components with regard to controller 20 applies as well to controller 220 except where specifically noted otherwise.

Manifold 22 of controller 220 is similar to manifold 22 of controller 20 in that lower portion 32 of block 28 of controller 220 is formed to include first portal 34, upper portion 36 of block 28 of controller 220 is formed to include both chamber 38 and second portal 40, and cap 30 of controller 220 is formed to include exhaust portal 42, as was the case with controller 20. However, block 28 of controller 220 has a guide-receiving space 226 that extends vertically downwardly from chamber 38. One portion of regulator 24 of controller 220 is situated in chamber 38 between block 28 and cap 30 and another portion of regulator 24 extends into guide-receiving space 226. First portal 34 of controller 220 is connectable to a source of pressurized air (not shown). Second portal 40 of controller is connectable to actuator 282. Exhaust portal 42 communicates pneumatically with interior region 371 of housing 336. In addition, chamber 38 of controller 220 communicates pneumatically with second portal 40 and with exhaust portal 42.

Solenoid valve 26, regulator 24, and check valve 222 operate to control the flow of pressurized air through manifold 22. When solenoid valve 26 of controller 220 is de-energized, pressurized air is prevented from entering first portal 34 and flowing through manifold block 28 as shown in FIGS. 10, 12, 14 and 15. When solenoid valve 26 of controller 220 is energized, pressurized air is able to flow through manifold block 28 and through a portion of solenoid valve 26 as shown in FIGS. 11 and 13. A portion of regulator 24 is located in chamber 38 above portal 34 and beneath both manifold cap 30 and portal 40. Thus, pressurized air flowing through block 28 of controller 220 from portal 34 to portal 40 flows upwardly through block 28 and passes by regulator 24.

Figure 12:
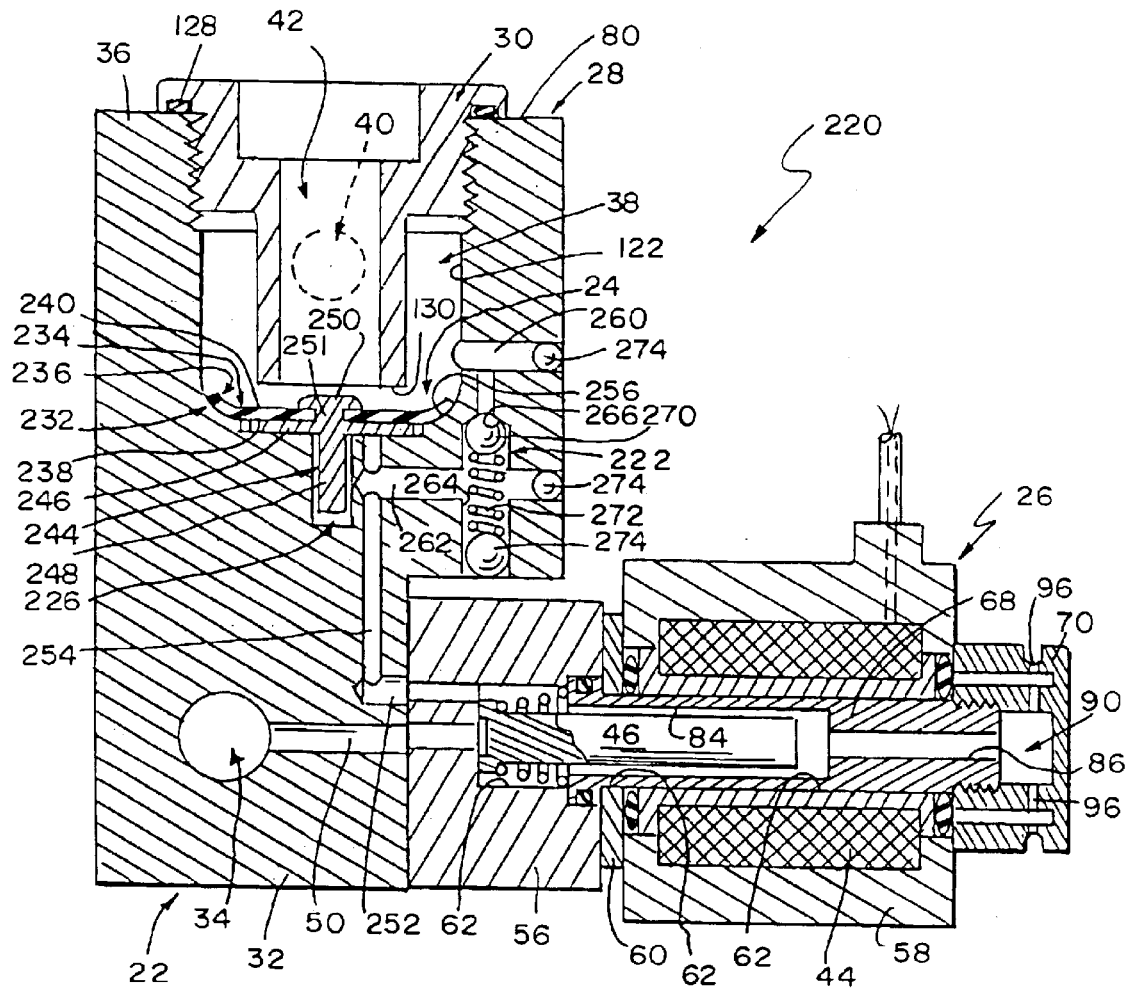
FIG. 12 is a diagrammatic cross sectional view of the pneumatic exhaust controller of FIG. 10 showing the plunger in a first position blocking pneumatic communication between the first portal and the vertical flow passage, the check valve closing a second flow passage which extends between the chamber and the vertical flow passage, and the diaphragm spaced apart from the manifold cap so that a backing plate of a guide which is coupled to the diaphragm rests upon an end surface that defines the bottom of the chamber formed in the manifold block.
Figure 13:
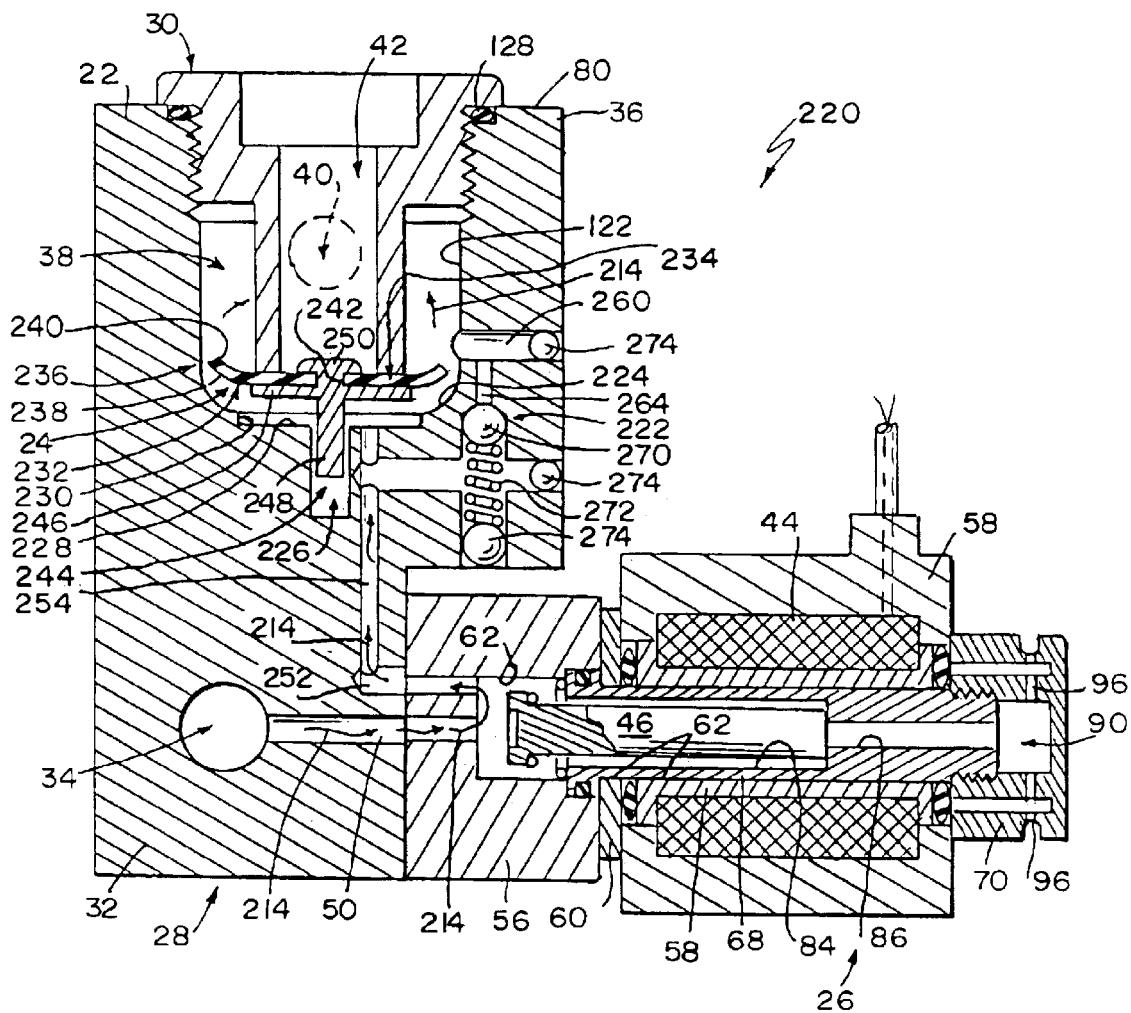
FIG. 13 is a diagrammatic cross sectional view, similar to FIG. 12, showing the plunger in a second position allowing pneumatic communication between the first portal and the vertical flow passage, the diaphragm being moved upwardly by the pressurized air so that a closure disk portion of the diaphragm engages the manifold cap to block the exhaust portal, the pressurized air flowing past the valve portion of the diaphragm and out of the second portal, and the check valve continuing to close the second flow passage.

The pressurized air flowing upwardly in block 28 of controller 220 causes regulator 24 to move from a first position, shown in FIGS. 10 and 12, to a second position, shown in FIGS. 11 and 13. Regulator 24 of controller 220 blocks pneumatic communication between chamber 38 and exhaust portal 42 when in the second position. After the pressurized air flowing upwardly moves regulator 24 of controller 220 to the second position, the pressurized air moves further upwardly past regulator 24 to reach the portion of chamber 38 above regulator 24. When regulator 24 is in the second position, the pressurized air that flows upwardly into the portion of chamber 38 above regulator 24 then exits block 28 of controller 220 through portal 40.

Figure 14:
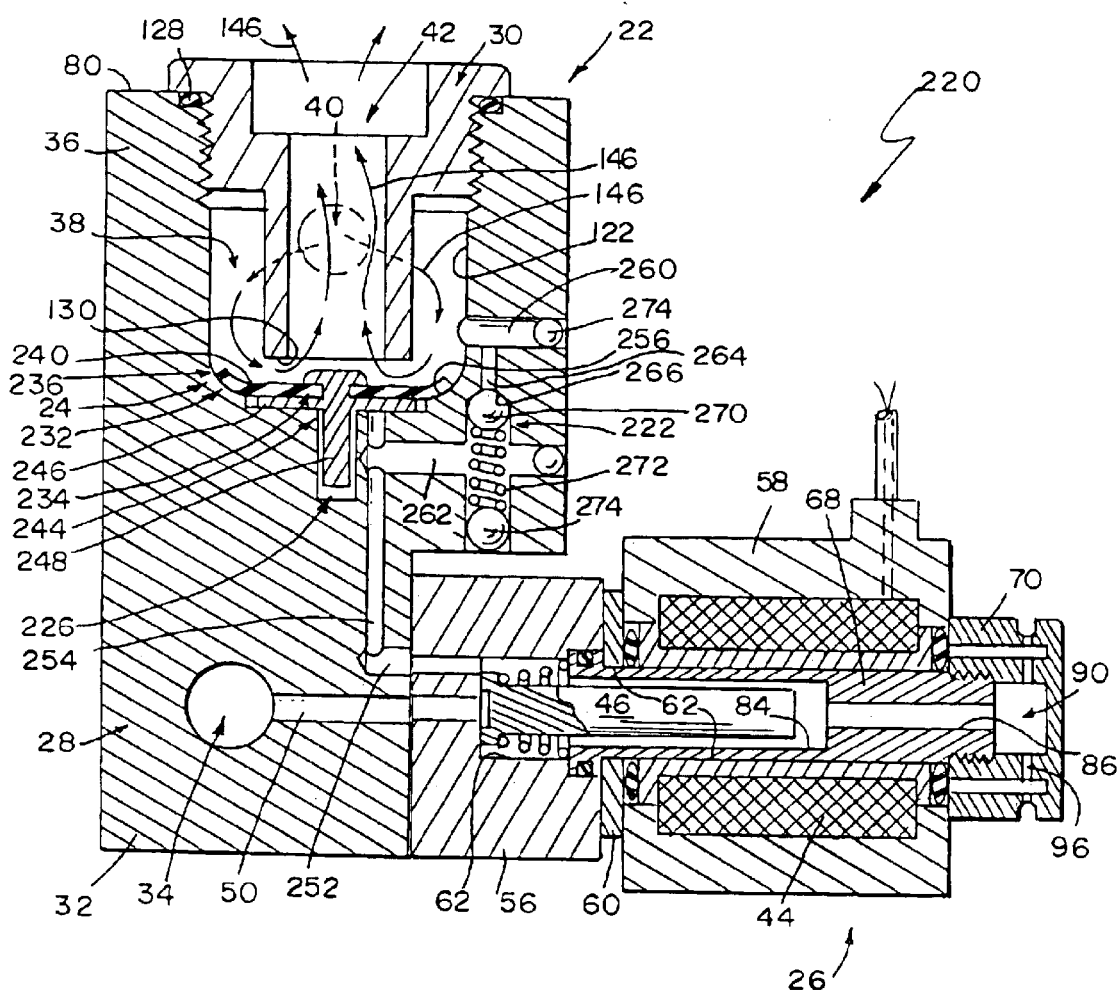
FIG. 14 is a diagrammatic cross sectional view, similar to FIG. 13, showing the diaphragm moved away from the manifold cap, the backing plate blocking the vertical flow passage, the check valve continuing to close the second flow passage, and pressurized air entering the chamber through the second portal (in phantom) and then exhausting out of the chamber upwardly through the exhaust portal.

If solenoid valve 26 of controller 220 is de-energized when regulator 24 is in the second position, the portion of chamber 38 beneath regulator 24 normally depressurizes and regulator 24 moves from the second position back to the first position thereby unblocking pneumatic communication between chamber 38 and exhaust portal 42. If portal 42 is exposed to pressurized air after regulator 24 moves back to the first position, the pressurized air moves through portal 40 into chamber 38 and then upwardly through exhaust portal 42 of controller 220 as shown in FIG. 14. When regulator 24 of controller 220 is in the first position, pressurized air will exhaust through portal 42 until the pressure in chamber 38 and portal 40 reach equilibrium with the pressure of the ambient environment of interior region 371 of housing 336.

If regulator 24 of controller 220 is in the first position and the pressure beneath regulator 24 exceeds the pressure above regulator 24 by a threshold amount, then regulator 24 moves from the first position to the second position. If regulator 24 of controller 24 is in the second position and the pressure beneath regulator 24 does not exceed the pressure above regulator pressure above regulator 24 by the threshold amount, then regulator 24 normally moves from the second position toward the first position. Regulator 24 of controller 220 is biased by gravity toward the first position. Therefore, when regulator 24 of controller 220 is in the second position, if the pressure beneath regulator 24 is equal to the pressure above regulator 24 or if the pressure beneath regulator 24 is greater than the pressure above regulator 24 but less than the threshold amount to maintain regulator 24 in the second position, then regulator 24 normally will move from the second position toward the first position due to gravitational forces acting on regulator 24.

A central region of the upper surface of regulator 24 is exposed to ambient pressure extant in portal 42 when regulator is in the second position and an annular outer region of the upper surface of regulator 24 is exposed to the pressure extant in chamber 38. Thus, the pressure above regulator 24 when regulator 24 is in the second position is considered to be the average pressure to which the central region and the annular outer region of the upper surface of regulator 24 is exposed. When regulator 24 of controller 220 is in the second position, almost all of the bottom surface of regulator 24 is exposed to the pressure in chamber 38 (a portion of regulator 24 is situated in guide-receiving space 226 rather than chamber 38 when regulator 24 is in the second position). Thus, when regulator 24 of controller 220 is in the second position and chamber 38 is pressurized by a sufficient amount, regulator 24 of controller 220 is maintained in the second position, even if a static condition exists having not air flow through chamber 38, because the average pressure to which the bottom surface of regulator is exposed exceeds the average pressure to which the top surface of regulator 24 is exposed.

Figure 15:
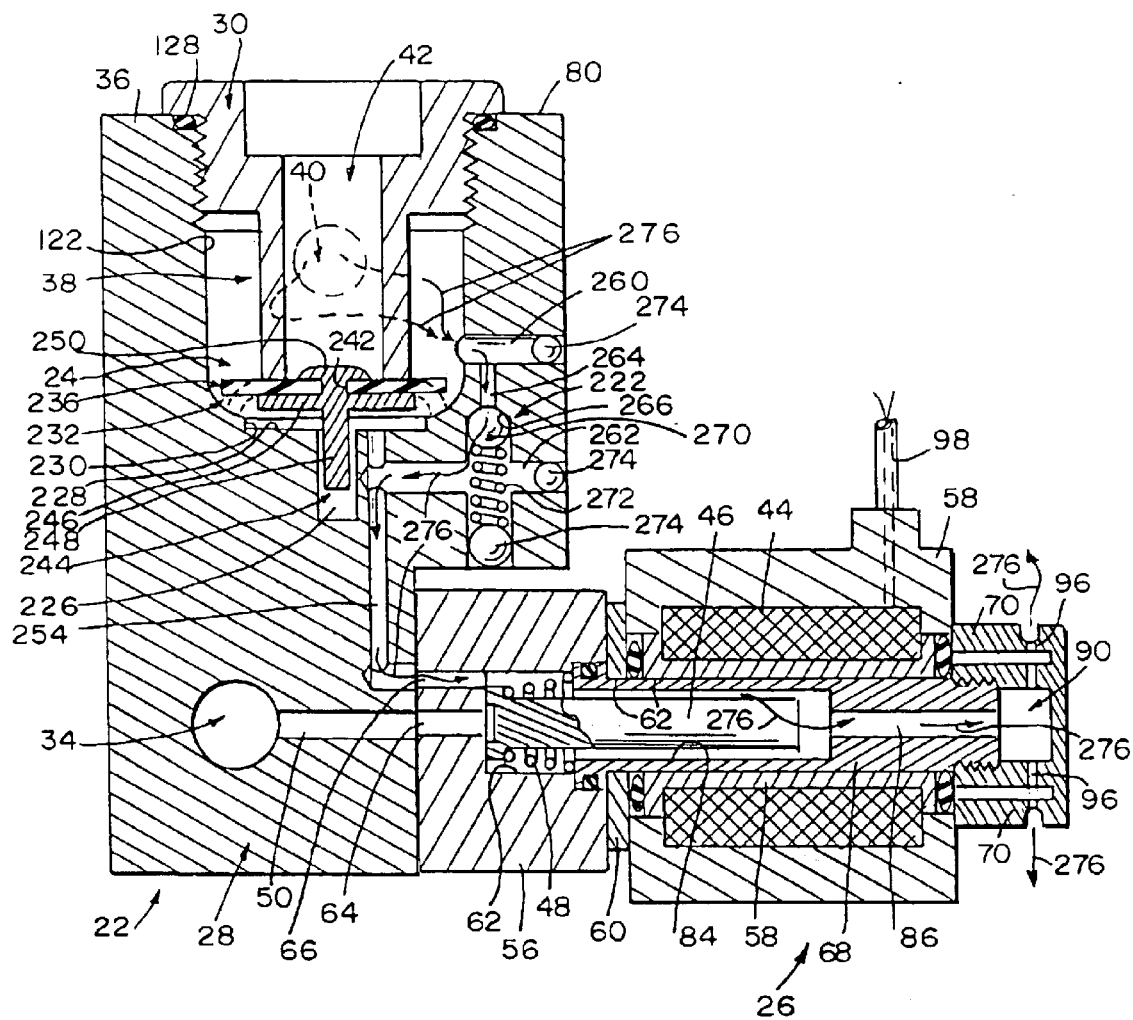
FIG. 15 is a diagrammatic cross sectional view, similar to FIG. 13, showing the plunger in the first position blocking pneumatic communication between the first portal and the vertical flow passage, the diaphragm being stuck inadvertently against the manifold cap blocking the exhaust portal, the check valve moving to open the second flow passage and pressurized air entering the chamber through the second portal (in phantom) and flowing through the second flow passage, downwardly through the vertical flow passage, horizontally through a space around the plunger, and into a vent tube of the solenoid valve.

Under normal operating conditions of controller 220, check valve 220 is closed. If regulator 24 of controller 220 inadvertently becomes stuck in the second position, such that regulator 24 does not move from the second position to the first position when the region of chamber 38 beneath regulator 24 depressurizes, then check valve 222 will open once the pressure in chamber 38 rises to a threshold pressure level as shown in FIG. 15. When check valve 222 opens, pressurized air in chamber 38 flows through block 28 around regulator 24 and into solenoid valve 26 to be vented to the ambient environment through bores 62, bore 84 of tube 68, vent passage 86 of tube 68, vent chamber 90 of cap 70, and orifices 96 of cap 70 as also shown in FIG. 11.

Manifold block 28 of controller 220 is formed to include first flow passage 50, which is similar to passage 50 of controller 20, a second flow passage 252, and a third flow passage 254 as shown, for example, in FIGS. 10 and 12. Passage 252 communicates pneumatically with passage 254 and extends horizontally from passage 254 through lower portion 32 of block 28 in parallel relation with passage 50. Passage 254 extends vertically in block 28 between chamber 38 and passage 252. Because block 28 of controller 220 has guide-receiving space 226 extending downwardly from chamber 38 along axis 148, passage 254 is offset from axis 148 toward solenoid valve 26. Thus, passage 252 of controller 220 is shorter than passage 52 of controller 20. Portals 34, 40 of controller 220 are adapted to connect to appropriate fittings or couplers, such as fitting 374 or other suitable threaded fittings or quick connect couplers having passages therethrough, to connect controller 220 to the source of pressurized air and to actuator 282.

In the illustrative embodiment of controller 220, portal 34 extends horizontally into block 28 from a front surface 78 of block 28 along axis 150, portal 40 extends horizontally into block 28 from a back surface (unnumbered in the FIGS.) of block 28 along axis 152, and chamber 38 extends vertically into block 28 from a top surface 80 of block 28 along axis 148 as shown in FIGS. 10 and 11. Also in the illustrative embodiment of controller 220, passages 50, 252 extend into block 28 from a side surface 82 of the lower portion 32 of block 28. It should be noted that, unlike FIGS. 7–9, the location of portal 40 of controller 220 has not been moved in FIGS. 12–15, but rather is illustrated (in phantom) behind manifold cap 30.

Illustrative regulator 24 of controller 220 comprises a diaphragm 232 having a closure disk portion 234 and a valve portion 236 coupled to the outer periphery of disk portion 234. Illustrative regulator 24 of controller 220 further comprises a guide 244 coupled to diaphragm 232. Diaphragm 232 has a bottom surface 238, an upper surface 240, and a central aperture 242 extending between surfaces 238, 240. Diaphragm 232 is flexible such that an outer peripheral region of valve portion 236 curls upwardly so as to be higher in elevation than disk portion 234 when regulator 24 is in the first position. The outer peripheral region of diaphragm 232 also curls upwardly when pressurized air is flowing upwardly around diaphragm 232 as shown in FIG. 13. When regulator 24 is in the second position and no air is flowing around diaphragm 232, the outer peripheral region of diaphragm 232 is substantially flat as shown in FIG. 15 (in solid). When regulator 24 is stuck in the second position, the outer peripheral region of diaphragm 232 sometimes curls downwardly as shown in FIG. 15 (in phantom).

Diaphragm 232 has a generally uniform thickness between surfaces 238, 240. In the one embodiment of controller 220, diaphragm 232 has a thickness of about 0.070 inches (0.1778 cm) and a nominal outer diameter of about 0.835 inches (2.12 cm). The diameter of cylindrical surface 122 of block 28 is about 0.847 inches (2.15 cm). Thus, a small amount of clearance exists between diaphragm 232 and surface 122 when regulator 24 is in the second position. Diaphragm 232 is made from a resilient material, such as, for example, Nitril material, which meets military specification Mil-P-53-15, or any other suitable material capable of sealing exhaust portal 42.

Guide 244 comprises a circular backing member or disk 246, a post 248 extending downwardly from backing member 246, a circular head 250 above backing member 246, and a connecting portion 251 extending vertically between head 250 and backing member 246. To assemble regulator 24 of controller 220, diaphragm 232 is snapped over head 250 of guide 244 so that connecting portion 251 is received in aperture 242 of diaphragm 232. The diameter of head 250 is larger than the diameter of aperture 242 but is small enough so that diaphragm 232 is able to deform by a sufficient amount to permit head 250 to pass through aperture 242. The diameter of backing member 246 is substantially larger than the diameter of head 250. The diameter of connecting portion 251 is approximately the same as the diameter of aperture 242. In addition, the distance between the undersurface of head 250 and the upper surface of backing member 246 is about the same as the thickness of diaphragm 232. Optionally, adhesive is provided between bottom surface 238 of diaphragm 232 and backing member 246 to further couple guide 244 to diaphragm 232.

The portion of diaphragm 232 above backing member 246 is considered to be the closure disk portion 234 of diaphragm 232 and the portion of diaphragm 232 that extends radially beyond backing member 246 is considered to be the valve portion 236 of diaphragm 232. The bottom of chamber 38 of controller 220 is defined by a stepped portion of block 28 which comprises a horizontal outer surface 224, a horizontal inner surface 228 that is recessed below surface 224 by a slight amount, and a cylindrical surface 230 that interconnects surfaces 224, 228. The bottom end of cylindrical surface 122 of block 28 of controller 220 blends smoothly into portion 228 along an arced or radiused region 256. The outer peripheral region of diaphragm 232 substantially matches the contour of arced region 256 of block 28 of controller 220.

When regulator 24 of controller 220 is in the first position, shown in FIGS. 10 and 12, backing member 246 engages surface 228 of block 28 and valve portion 236 of diaphragm engages surface 224 as well as arced region 256 to block pneumatic communication between passage 254 and each of chamber 38 and portals 40, 42. When regulator 24 of controller 224 is in the second position, surface 240 engages end edge 130 of cap 30 to block pneumatic communication between exhaust portal 42 and each of chamber 38, portal 40, and passage 254. Thus, end edge 130 of wall 120 provides a valve seat that faces toward surface 240 of diaphragm 232.

Valve portion 236 of diaphragm 232 has a circular outer region which generally follows the contour of arced region 256 and which engages arced region 256 of block 28 under some pressure conditions and that disengages from region 256 under other pressure conditions. For example, when regulator 24 is in the first position, the circular outer region of valve portion 236 engages region 256. In addition, when regulator 24 moves initially from the first position to the second position due to being exposed to pressured air via passage 254, the upper region of valve portion 236 moves away from region 256 and remains spaced apart from surface 122.

After surface 240 of disk portion 234 engages edge 130 of wall 120, diaphragm 232 is unable to move vertically upwardly any further which results in an increase in the pressure in the space defined in chamber 38 beneath diaphragm 232 and beneath backing member 246. When regulator 24 is in the second position and the pressure in the space beneath regulator 24 rises, the pressurized air passes between valve portion 236 and surface 122 and flows into the portion of chamber 38 above diaphragm 232, and out of chamber 38 through portal 40 as indicated by arrows 214 in FIGS. 11 and 13. The outer peripheral region of diaphragm 232 curls upwardly due to the movement of pressurized air in the direction indicated by arrows 214.

When regulator 24 of controller 220 is in the second position sealingly engaging edge 130 of wall 120 and the associated solenoid valve 26 is de-energized to move plunger 46 to the first position blocking pneumatic communication between passage 64 and passage 66, the pressurized air extant in the space beneath regulator 24, as wells as the pressurized air extant in passages 64, 254 vents to atmosphere through bore 62 of body 56, bore 84 of vent tube 68, passage 86 of vent tube 68, chamber 90 of vent cap 70, and orifices 96 of vent cap 70. As the pressurized air vents to atmosphere through cap 70, the pressure beneath diaphragm 232 and backing member 246 decreases. Once the pressure beneath diaphragm 232 and backing member 246 decreases by a threshold amount, regulator 24 normally moves from the second position vertically downwardly to the first position so that surface 240 of disk portion 234 disengages from end edge 130 of wall 120. After surface 240 disengages from edge 130, if the pressure to which portal 40 is exposed is greater than the pressure to which portal 42 is exposed, then pressurized air will flow through portal 40 into chamber 38 and then out of chamber 38 through portal 42 as indicated by arrows 146 shown in FIG. 14.

Post 248 of guide 244 is received in guide-receiving space 226 with a minimal amount of clearance between the cylindrical outer surface of post 248 and the cylindrical surface defining space 226. It should be noted that the clearance between post 248 and the cylindrical surface defining space 226 is exaggerated in the drawings. As regulator 24 of controller 220 moves between the first and second positions, post 248 is guided by the cylindrical surface defining space 226. Thus, the cylindrical surface defining space 226 cooperates with guide 244 to maintain the proper alignment of diaphragm 232 in chamber 38 as regulator 24 moves between the first and second positions.

Upper portion 36 of manifold block 28 of controller 220 has a bypass passage that extends between chamber 38 and passage 254 as shown in FIGS. 10–15. Check valve 222 is situated in this bypass passage. The bypass passage comprises a first horizontal passage 260 that extends from chamber 38, a second horizontal passage 262 that extends from passage 254, and a vertical passage 264 extending between passages 260, 262. Passage 264 is formed to define a valve seat 266 in block 28. In addition, passage 264 has a large-diameter lower portion beneath valve seat 266 and a small-diameter upper portion above valve seat 266. Check valve 222 comprises a ball 270 and a coil spring 272 that normally biases ball 270 into sealing engagement with valve seat 266.

Passages 260, 262, 264 are formed by drilling block 28 with appropriately sized drill bits. Passages 260, 262, 264 are plugged with oversized balls 274 that are force fit into passages 260, 262, 264. The oversized ball 274 associated with passage 264 has a larger diameter than the diameter of the oversized balls 274 associated with passages 260, 262. Ball 270 and spring 272 are inserted into passage 264 prior to insertion of the associated oversized ball 274 into passage 264. Spring 272 is maintained in a state of compression between balls 270, 274. If regulator 24 of controller 220 inadvertently becomes stuck in the second position when the region of chamber 38 beneath regulator 24 depressurizes due to solenoid valve 26 being de-energized, then ball 270 moves away from valve seat 266 against the bias of spring 272 once the pressure in chamber 38 rises to a threshold pressure level as shown in FIG. 15.

When ball 270 moves away from valve seat 266, pressurized air in chamber 38 flows through passages 254, 260, 262, 264 of block 28 and through solenoid valve 26 to the ambient environment as indicated by arrows 276 shown in FIG. 15. When regulator 24 is stuck in the second position, the outer peripheral region of diaphragm 232 may flex downwardly into sealing engagement with arced region 256 of chamber 38, as shown in FIG. 15 (in phantom) as a result of pressurized air attempting to flow downwardly around diaphragm 232. Once the outer peripheral region of diaphragm 232 flexes downwardly in this manner, pressurized air in chamber 38 can only escape from controller 220 along the flow path through check valve 222 indicated generally by arrows 276.

Controllers 20, 220 are both configured to permit rapid or quick exhaust of pressurized air through respective chambers 38 and portals 40, 42 when the associated regulators 24 move from the second positions, blocking the respective portal 42, back to the first positions, unblocking the respective portal 42. When solenoid valve 26 of either controller 20, 220 is de-energized, either intentionally or due to a loss of electrical power, the quick exhaust of pressurized air from space 358 of actuator 282 occurs automatically so that shut-off valve module 284 moves rapidly from the opened position to the closed position.

Although illustrative controllers 20, 220 each have solenoid valve 26 for opening and closing passages 64, 66, it is within the scope of this disclosure for other types of actuators to be used to open and close passages 64, 66. For example, a stepper motor or other type of motor that moves, either directly or via a mechanical linkage, a plunger or other valve member to open and close passages 64, 66 may be provided in controllers 20, 220 in lieu of solenoid valve 26. In the illustrative embodiments, solenoid valve 26 is, for example, a Series 8 solenoid valve available from Nass Magnet of Hanover, Germany. Suitable solenoid valves are available from other manufacturers as well. Additional details of controllers 20, 220 and shut-off valve assembly 280 are found in U.S. patent application Ser. No. 10/162,448 and in U.S. patent application Ser. No. 10/162,359, which are filed concurrently herewith and which are hereby incorporated by reference herein in their entirety.

Although certain illustrative embodiments have been described in detail above, variations and modifications exist within the scope and spirit of this disclosure as described and as defined in the following claims.

What is claimed is:

1. A shut-off valve apparatus comprising
   a valve body and a valve member coupled to the valve body, the valve member being movable between a first position blocking material flow through the valve body and a second position permitting material flow through the valve body,
   a pneumatic actuator that, when actuated by pressurized air, moves and interacts with the valve member being isolated from the pressurized air to move the valve member from the first position to the second position,
   a manifold having a first portal configured to receive pressurized air, a second portal coupled to the pneumatic actuator, and an exhaust portal, regulator means coupled to the manifold for closing the exhaust portal in response to pressurized air being communicated to the regulator means through the first portal and for passing pressurized air to the second portal when pressurized air is communicated to the regulator means through the first portal, the pneumatic actuator being actuated by pressurized air exiting the manifold through the second portal, and an electrical actuator configurable between a blocking position blocking pneumatic communication between the first portal and the regulator means and an unblocking position allowing pneumatic communication between the first portal and the regulator means.

2. The shut-off valve apparatus of claim 1, wherein the electrical actuator comprises a solenoid valve coupled to the manifold, the solenoid valve is configured to block communication of pressurized air from the first portal to the regulator means when the solenoid valve is de-energized, and the solenoid valve being configured to permit communication of pressurized air from the first portal to the regulator means when the solenoid valve is energized.

3. The shut-off valve apparatus of claim 2, wherein the regulator means comprises a closure disk portion that moves to a first position closing the exhaust portal when the solenoid valve is energized and the first portal is exposed to pressurized air and that moves to a second position opening the exhaust portal when the solenoid valve is de-energized and the second portal is exposed to pressurized air.

4. The shut-off valve apparatus of claim 3, wherein the closure disk portion has a periphery, the regulator means comprises a valve portion appended to the periphery of the closure disk portion, and the valve portion moves relative to the closure disk portion to permit pressurized air to flow past the valve portion to reach the second portal when the closure disk portion is in the first position.

5. The shut-off valve apparatus of claim 2, wherein the regulator means comprises a diaphragm, the diaphragm has a closure disk portion that closes the exhaust portal when the solenoid valve is energized and the first portal receives pressurized air, and the diaphragm has a valve portion around which pressurized air flows to reach the second portal when the closure disk portion is closing the exhaust portal.

6. The shut-off valve apparatus of claim 5, wherein the regulator means comprises a guide coupled to the diaphragm, the manifold has a guide-receiving passage, the guide extends away from the diaphragm and into the guide-receiving passage, and the guide moves within the guide-receiving passage when the diaphragm moves.

7. The shut-off valve apparatus of claim 5, wherein the regulator means further comprises a backing member coupled to the diaphragm and the closure disk portion is sandwiched between the backing member and the exhaust portal when the diaphragm closes the exhaust portal.

8. The shut-off valve apparatus of claim 5, wherein the manifold has a surface defining a chamber, the diaphragm is received in the chamber, the diaphragm has a circular outer region that engages the surface when pressurized air flows from the second portal to the exhaust portal, and at least a portion of the circular outer region of the diaphragm is disengaged from the surface when pressurized air flows from the first portal to the second portal.

9. The shut-off valve apparatus of claim 2, wherein the solenoid valve has a plunger that is movable along a first axis, the regulator means comprises a member that moves along a second axis, and the first axis is orthogonal to the second axis.

10. The shut-off valve apparatus of claim 9, wherein the second axis passes through the exhaust portal.

11. The shut-off valve of claim 9, wherein the first portal extends along a third axis that is orthogonal to the first axis and that is orthogonal to the second axis.

12. The shut-off valve apparatus of claim 9, wherein the second portal extends along a third axis that is orthogonal to the first axis and that is orthogonal to the second axis.

13. The shut-off valve apparatus of claim 9, wherein the solenoid valve has a vent passage that extends along the first axis, the plunger has an outer surface, and pressurized air flows around the outer surface of the plunger and through the vent passage when the solenoid valve is de-energized.

14. The shut-off valve apparatus of claim 1, wherein the regulator means comprises a diaphragm having a first side and a second side, the diaphragm moves to a first position closing the exhaust portal when a pressure to which the first side is exposed exceeds a pressure to which the second side is exposed, and the diaphragm moves to a second position opening the exhaust portal when the pressure to which the second side is exposed exceeds the pressure to which the first side is exposed.

15. The shut-off valve apparatus of claim 14, wherein the diaphragm comprises a closure disk portion having a periphery, the diaphragm comprises a valve portion appended to the periphery of the closure disk portion, and pressurized air flows around the valve portion to reach the second portal when the closure disk portion is in the first position.

16. The shut-off valve apparatus of claim 14, wherein the first portal is in pneumatic communication with the second portal when the diaphragm is in the first position and the second portal is in pneumatic communication with the exhaust portal when the diaphragm is in the second position.

17. The shut-off valve apparatus of claim 14, wherein the manifold comprises a manifold block and a manifold cap coupled to the manifold block, the manifold cap has a cylindrical wall that defines the exhaust portal, the cylindrical wall has an end that provides a valve seat facing toward the diaphragm, and the second side of the diaphragm engages the valve seat when the diaphragm is in the first position.

18. The shut-off valve apparatus of claim 14, wherein the regulator means comprises a guide coupled to the diaphragm, the manifold has a guide-receiving passage, the guide extends away from the diaphragm and into the guide-receiving passage, and the guide moves within the guide-receiving passage when the diaphragm moves.

19. The shut-off valve apparatus of claim 18, wherein the regulator means comprises a backing member appended to the guide and the backing member abuts a portion of the first side of the diaphragm.

20. The shut-off valve apparatus of claim 1, further comprising a housing that surrounds the pneumatic actuator, the manifold, and the electrical actuator.

21. The shut-off valve apparatus of claim 20, wherein the housing has an opening aligned with the first portal.

22. A shut-off valve apparatus comprising
a main valve assembly having a valve body and a valve member coupled to the valve body, the valve member being movable between a first position blocking material flow through the valve body and a second position permitting material flow through the valve body,
a pneumatic actuator that, when actuated, moves the valve member from the first position to the second position, and
a controller having a manifold, a solenoid valve mounted to the manifold, and a quick-exhaust portion mounted to the manifold, the manifold being configured to permit pressurized air to flow therethrough to actuate the pneumatic actuator when the quick-exhaust portion is closed and the solenoid valve is energized, and the controller having a check valve that is openable to permit pressurized air to flow therethrough when the quick-exhaust portion is closed and the solenoid valve is de-energized.

23. The shut-off valve apparatus of claim 22, wherein the quick-exhaust portion has an exhaust portal extending along an axis, the check valve comprises a ball and a compression spring, and the ball is movable in parallel relation with the axis.

24. The shut-off valve apparatus of claim 22, further comprising a diaphragm that is movable along a first axis between a first position in which the quick-exhaust portion is opened and a second position in which the quick-exhaust portion is closed, the check valve comprises a ball that is movable along a second axis parallel with the first axis, and the solenoid valve comprises a plunger that is movable along a third axis orthogonal to the first axis.

25. The shut-off valve apparatus of claim 22, wherein the solenoid valve has a vent passage and the pressurized air flowing through the check valve also flows through the vent passage.

26. The shut-off valve apparatus of claim 22, wherein the manifold has a set of passages in which the check valve is situated.

27. A shut-off valve apparatus comprising
a main valve assembly having a valve body and a valve member coupled to the valve body, the valve member being movable between a first position blocking material flow through the valve body and a second position permitting material flow through the valve body,
a pneumatic actuator actuated by pressurized air that, when actuated, moves and interacts with the valve member being isolated from the pressurized air to move the valve member from the first position to the second position, and
a manifold having a first portal configured to receive pressurized air, a second portal coupled to the pneumatic actuator, and an exhaust portal,
a diaphragm movable relative to the manifold between a first position closing the exhaust portal to permit pressurized air to flow through the manifold from the first portal to the second portal and a second position opening the exhaust portal to permit pressurized air to flow through the manifold from the second portal to the exhaust portal, and
a guide coupled to the diaphragm, the manifold having a guide-receiving passage that receives at least a portion of the guide and the guide moves within the guide-receiving passage when the diaphragm moves between the first and second positions.

28. The shut-off valve apparatus of claim 27, further comprising a backing member coupled to the diaphragm and the diaphragm being situated between the backing member and the exhaust portal.

29. The shut-off valve apparatus of claim 27, wherein the exhaust portal defines an axis and the guide-receiving passage extends along the axis.

30. The shut-off valve apparatus of claim 27, wherein the manifold has a chamber in pneumatic communication with the second portal and the exhaust portal, the diaphragm is situated in the chamber, and the guide maintains the diaphragm in a proper orientation as the diaphragm moves between the first and second positions.

31. The shut-off valve apparatus of claim 27, wherein the diaphragm moves vertically between the first and second positions.

32. The shut-off valve apparatus of claim 31, wherein the diaphragm is biased by gravity toward the second position.

33. The shut-off valve apparatus of claim 1, wherein the pneumatic actuator further comprises a cylindrical wall and the movable member comprises a piston head situated in an interior region of the cylindrical wall.

34. The shut-off valve apparatus of claim 33, wherein the pneumatic actuator comprises a piston rod that is coupled to the piston head and that extends out of the interior region of the cylindrical wall, and further comprising a switch that is engaged by a portion of the piston rod outside the interior region to indicate the position of the piston rod relative to the cylindrical wall.

35. The shut-off valve apparatus of claim 33, further comprising a rod coupled to the valve member and a disc coupled to the rod, the piston head engaging the disc, and the piston head interacting with the valve member via the disc and the rod.

36. The shut-off valve apparatus of claim 35, wherein the valve body comprises a second cylindrical wall extending into the interior region of the cylindrical wall of the pneumatic actuator and terminating at a surface, the rod extending through a passage provided by the second cylindrical wall, and the disc engaging the surface when the valve member is in the second position.

37. The shut-off valve apparatus of claim 35, further comprising a spring compressed between the disc and the valve body to bias the valve member toward the first position.

38. The shut-off valve apparatus of claim 27, wherein the pneumatic actuator further comprises a cylindrical wall and the movable member comprises a piston head situated in an interior region of the cylindrical wall.

39. The shut-off valve apparatus of claim 38, wherein the pneumatic actuator comprises a piston rod that is coupled to the piston head and that extends out of the interior region of the cylindrical wall, and further comprising a switch that is engaged by a portion of the piston rod outside the interior region to indicate the position of the piston rod relative to the cylindrical wall.

40. The shut-off valve apparatus of claim 38, further comprising a rod coupled to the valve member and a disc coupled to the rod, the piston head engaging the disc, and the piston head interacting with the valve member via the disc and the rod.

41. The shut-off valve apparatus of claim 40, wherein the valve body comprises a second cylindrical wall extending into the interior region of the cylindrical wall of the pneumatic actuator and terminating at a surface, the rod extending through a passage provided by the second cylindrical wall, and the disc engaging the surface when the valve members is in the second position.

42. The shut-off valve apparatus of claim 40, further comprising a spring compressed between the disc and the valve body to bias the valve member toward the first position.

* * * * *